US006941216B2

(12) United States Patent
Isogai et al.

(10) Patent No.: US 6,941,216 B2
(45) Date of Patent: Sep. 6, 2005

(54) CRUISE CONTROL APPARATUS PERFORMING AUTOMATIC ADJUSTMENT OF OBJECT RECOGNITION PROCESSING IN RESPONSE TO DRIVER ACTIONS RELATING TO VEHICLE SPEED ALTERATION

(75) Inventors: Akira Isogai, Anjo (JP); Yukimasa Tamatsu, Okazaki (JP); Hiroaki Kumon, Kariya (JP); Eiji Teramura, Okazaki (JP)

(73) Assignee: Denso Corporation, Kariya (JP)

( * ) Notice: Subject to any disclaimer, the term of this patent is extended or adjusted under 35 U.S.C. 154(b) by 2 days.

(21) Appl. No.: 10/384,769

(22) Filed: Mar. 11, 2003

(65) Prior Publication Data

US 2003/0217880 A1 Nov. 27, 2003

(30) Foreign Application Priority Data

Mar. 12, 2002 (JP) ........................................ 2002-067159

(51) Int. Cl.[7] ............................. B60K 31/04; G06F 7/00; G06F 17/00
(52) U.S. Cl. ............................. 701/96; 701/93; 701/36; 180/167; 180/168; 180/170; 342/70
(58) Field of Search ........................ 701/96, 93, 1, 701/23, 33, 36, 79, 53; 342/70, 125; 180/167, 168, 170

(56) References Cited

U.S. PATENT DOCUMENTS

| 5,268,692 A | 12/1993 | Grosch et al. | |
|---|---|---|---|
| 5,761,629 A | * 6/1998 | Gilling | 701/96 |
| 5,901,806 A | * 5/1999 | Takahashi | 180/170 |
| 6,289,278 B1 | * 9/2001 | Endo et al. | 701/208 |
| 6,405,132 B1 | * 6/2002 | Breed et al. | 701/301 |
| 6,526,345 B2 | * 2/2003 | Ryoo | 701/93 |

FOREIGN PATENT DOCUMENTS

| JP | 4-201642 | 7/1992 |
|---|---|---|
| JP | 5-162596 | 6/1993 |
| JP | 6-191361 | 7/1994 |
| JP | 7-277116 | 10/1995 |
| JP | 7-318650 | 12/1995 |
| JP | 9-128698 | 5/1997 |
| JP | 10-129438 | 5/1998 |
| JP | 10-198893 | 7/1998 |
| JP | 11-84001 | 3/1999 |
| JP | 11-115544 | 4/1999 |
| JP | 2000-38121 | 2/2000 |

* cited by examiner

*Primary Examiner*—Olga Hernandez
(74) *Attorney, Agent, or Firm*—Posz Law Group, PLC

(57) ABSTRACT

A cruise control apparatus can control a host vehicle to run with a fixed separation from a preceding vehicle when such a preceding vehicle is detected based on received radar signals and to run at a preset fixed speed when no preceding vehicle is detected. The cruise control apparatus is configured to respond to one of a set of predetermined actions by the vehicle driver, which indicate an intention to change the vehicle speed, by making it easier or more difficult for a preceding vehicle to be detected, in accordance with whether the indicated intention may signify that an actual preceding vehicle is not being detected or may signify that a non-existent preceding vehicle is being detected and that the host vehicle speed has been reduced accordingly. Improved performance is thereby achieved by utilizing the cognitive abilities of the driver to augment the detection operation of the cruise control apparatus.

23 Claims, 19 Drawing Sheets

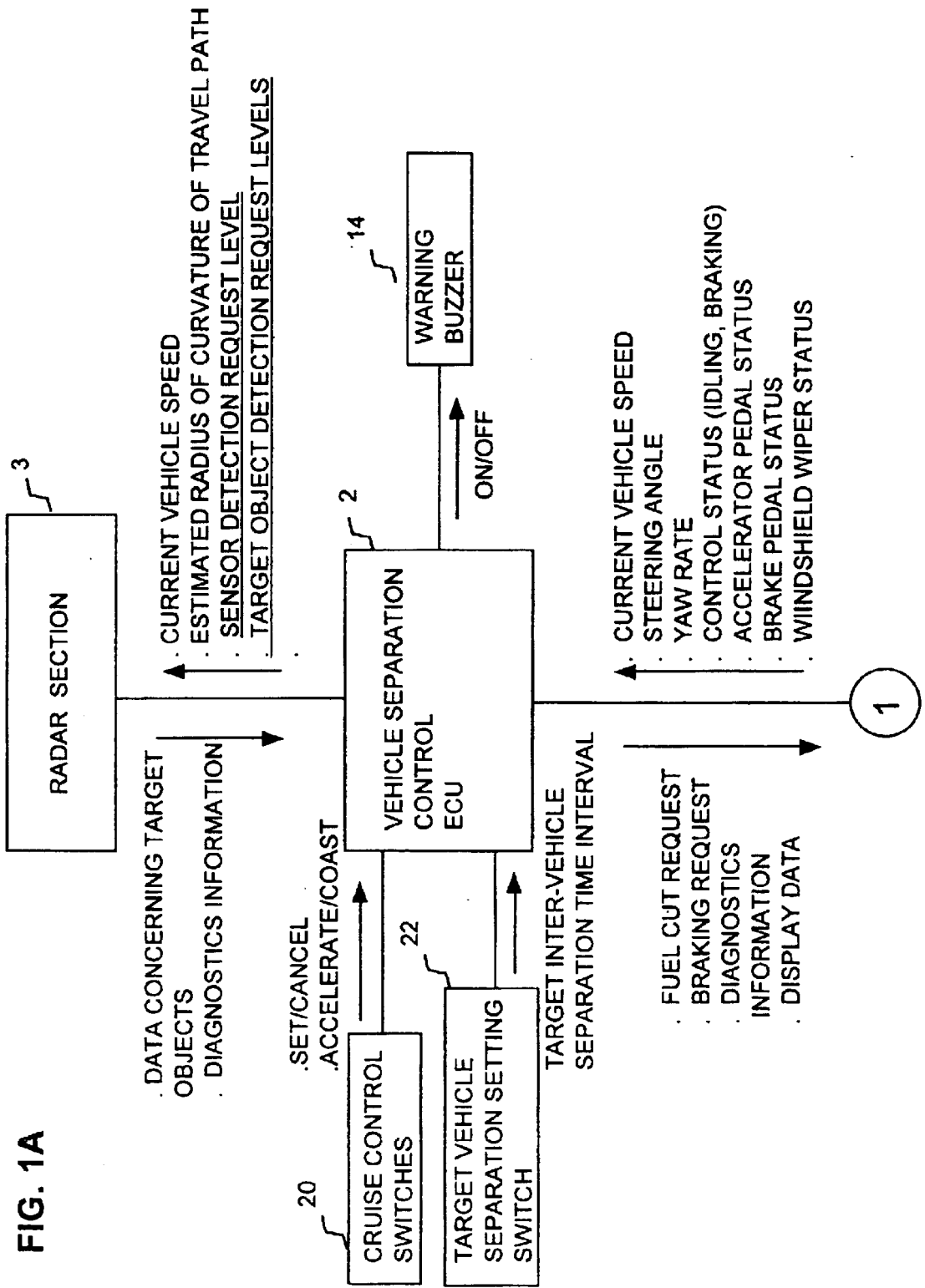

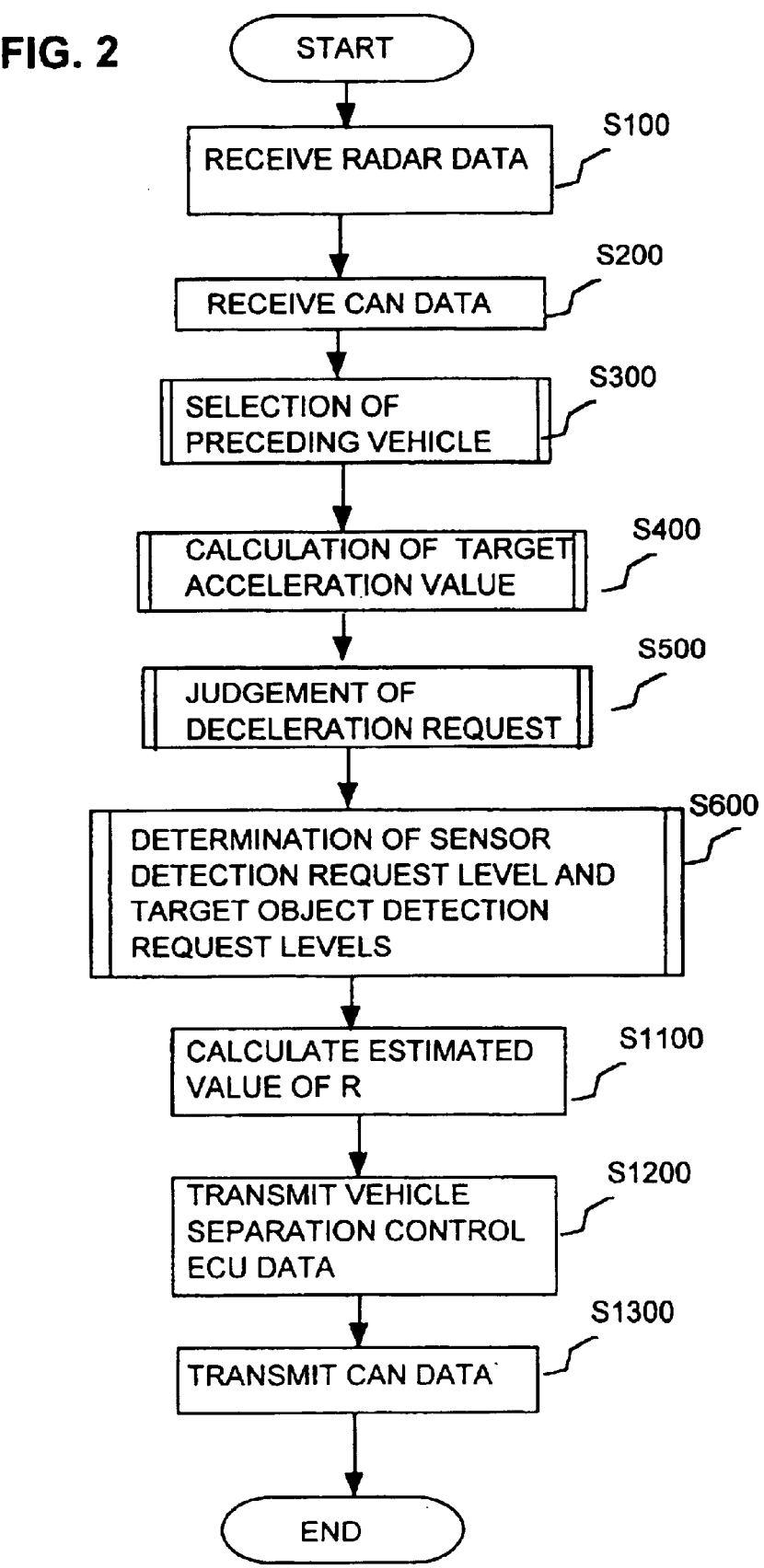

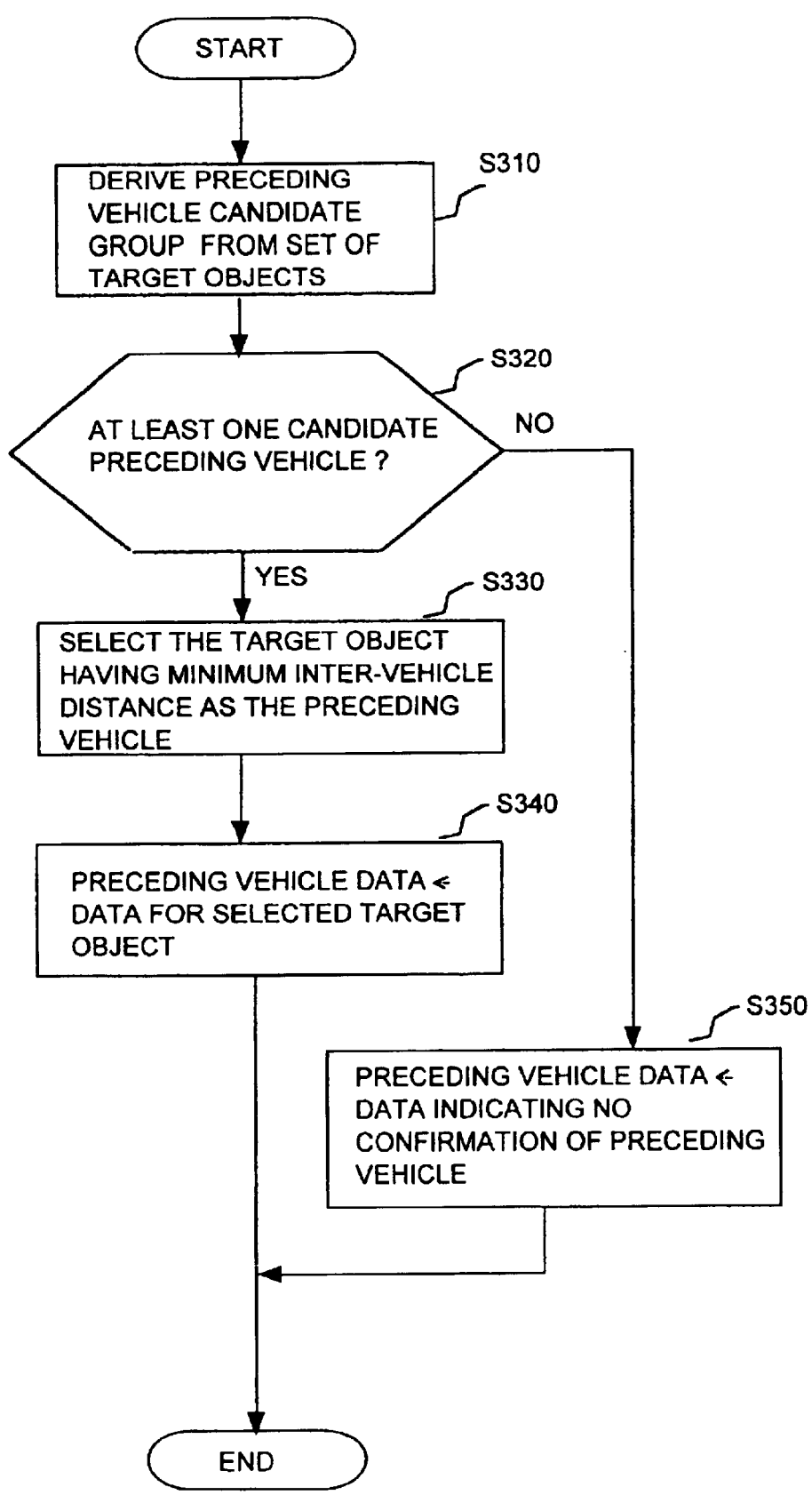

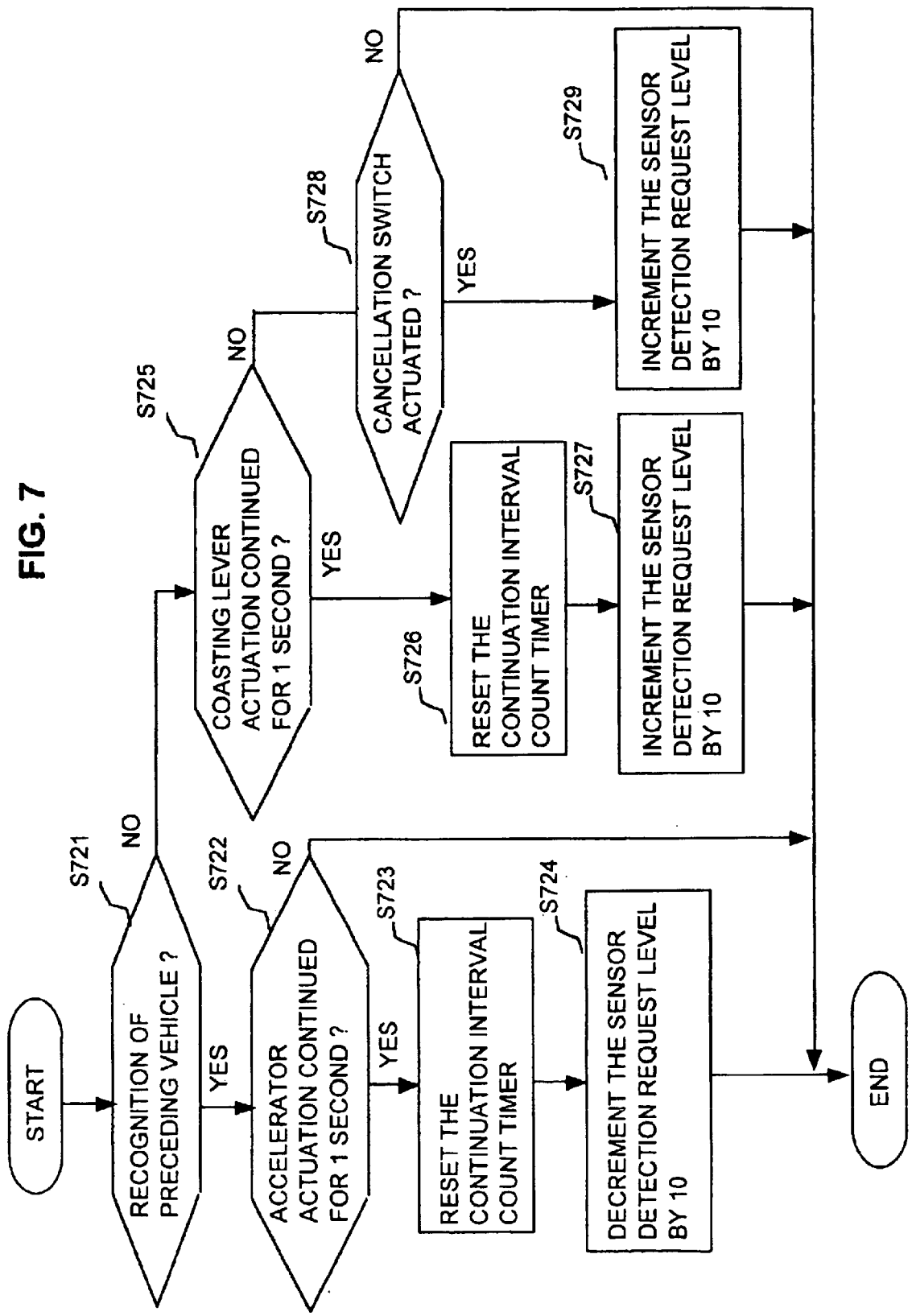

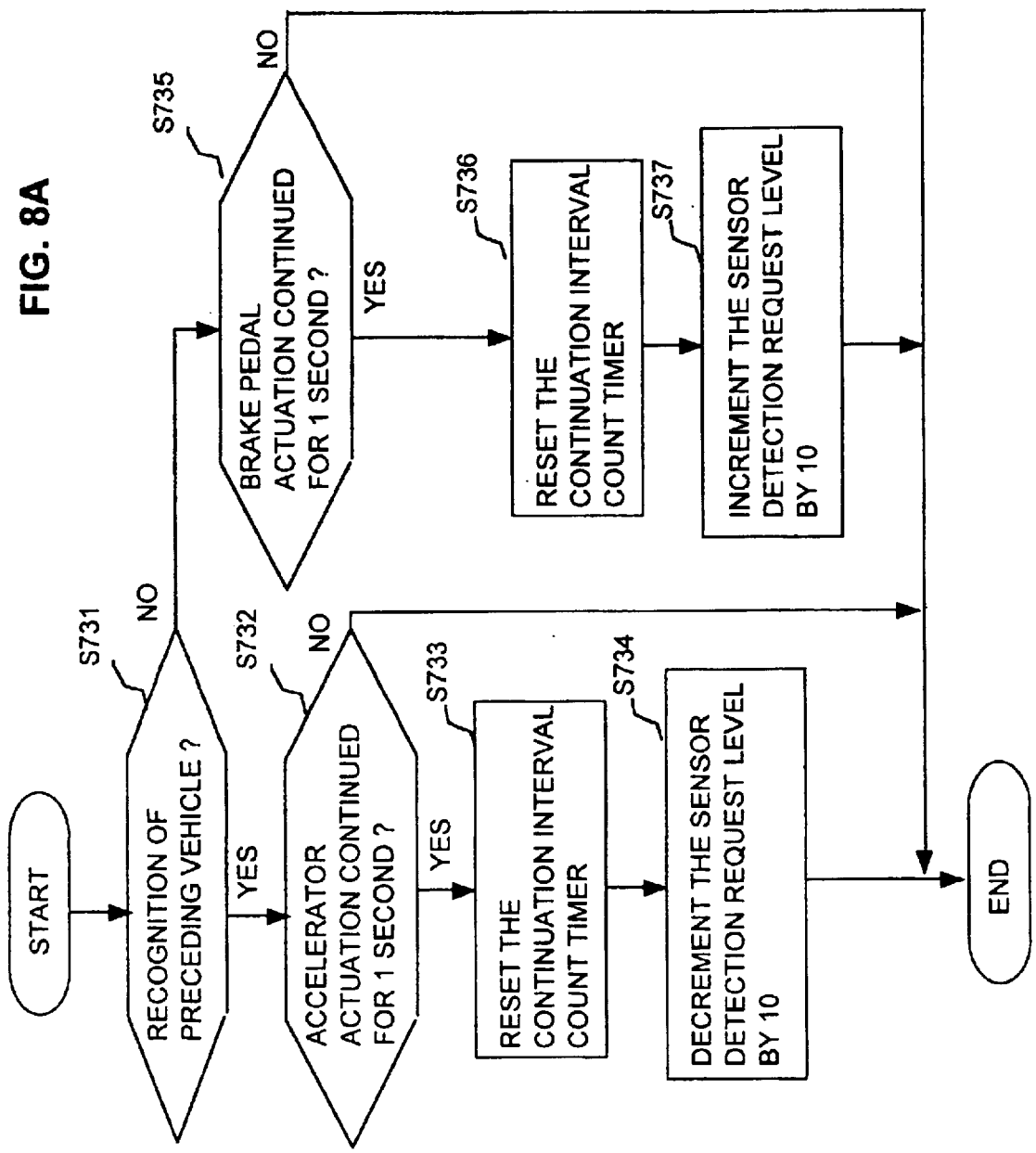

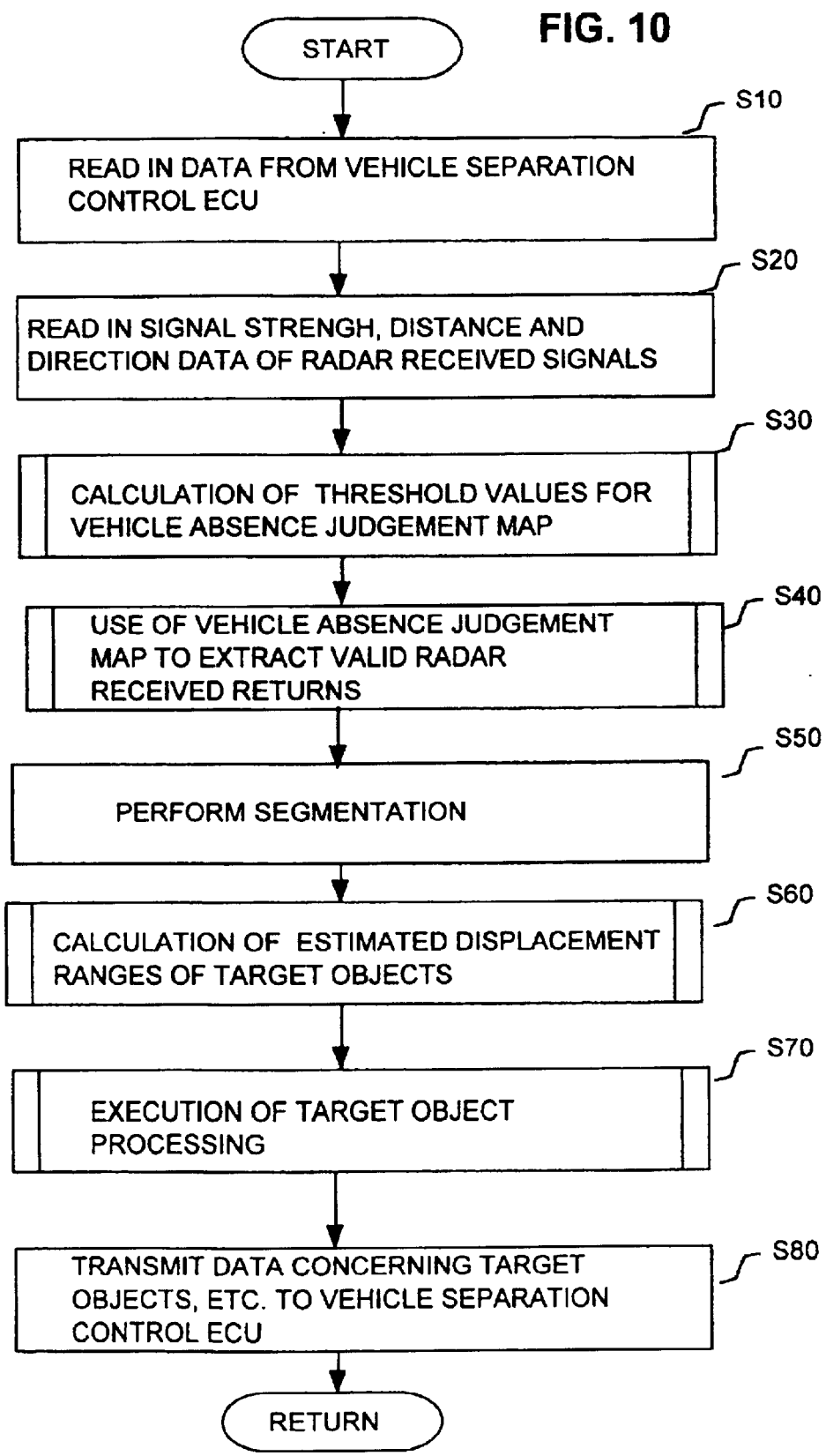

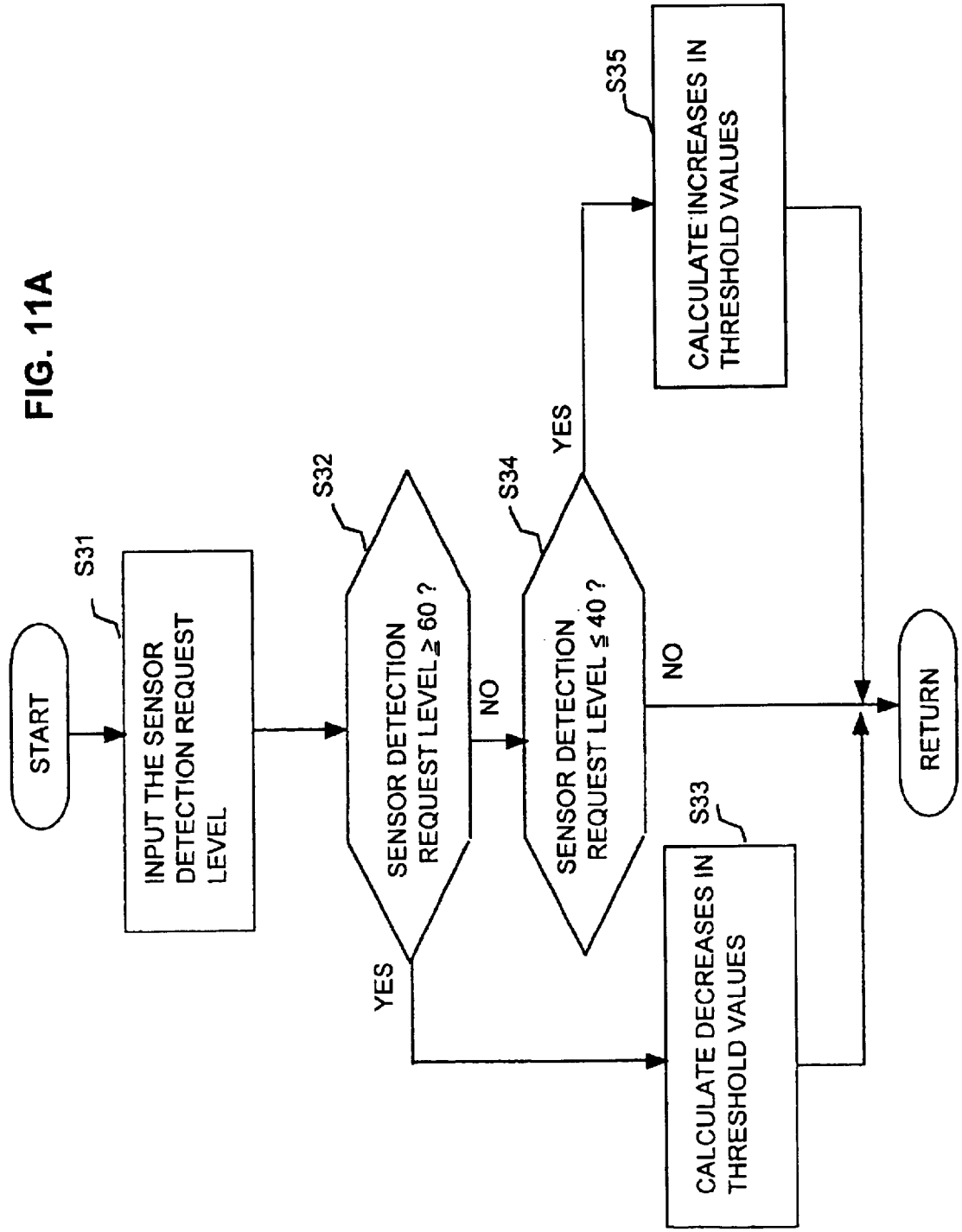

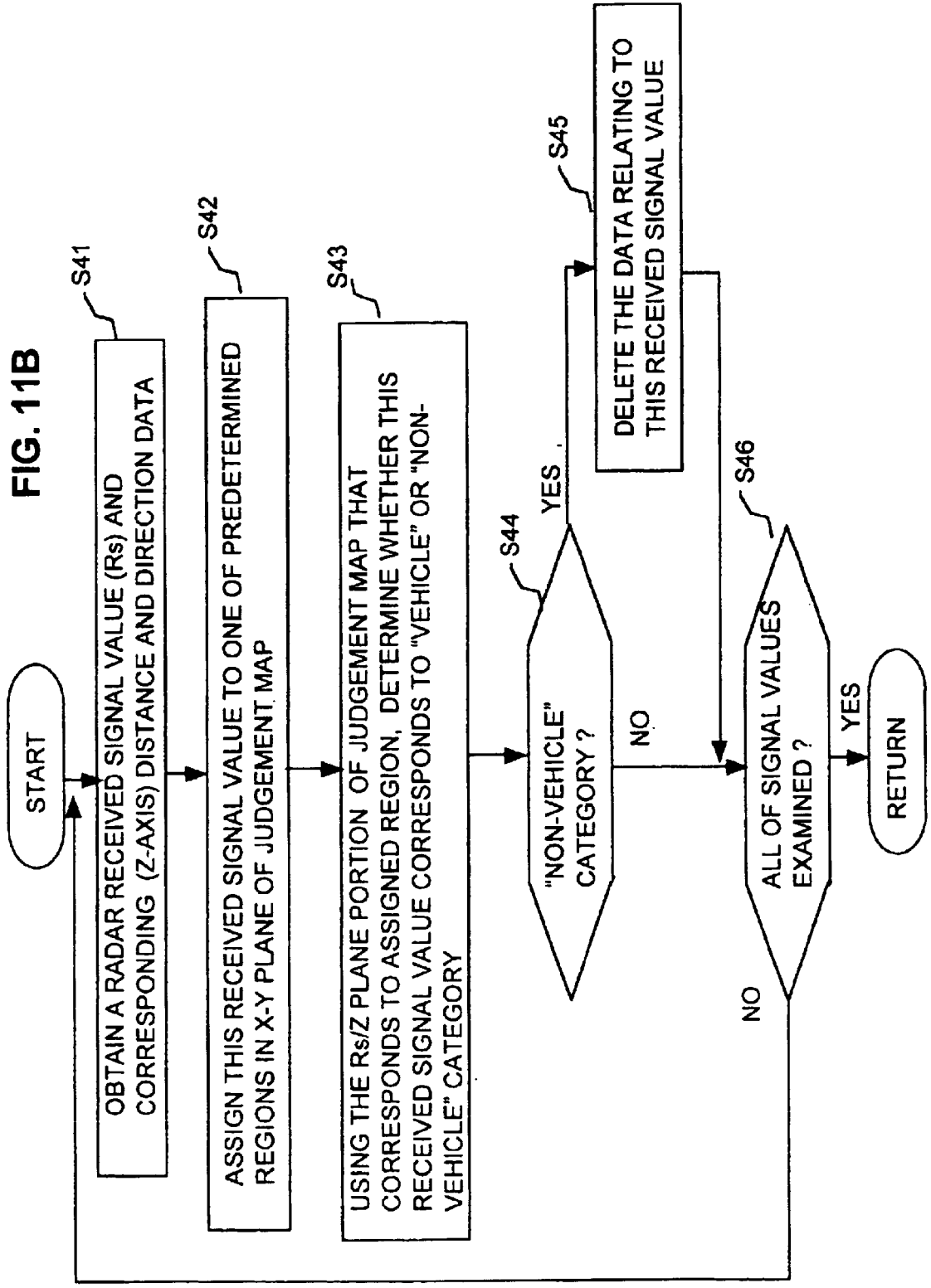

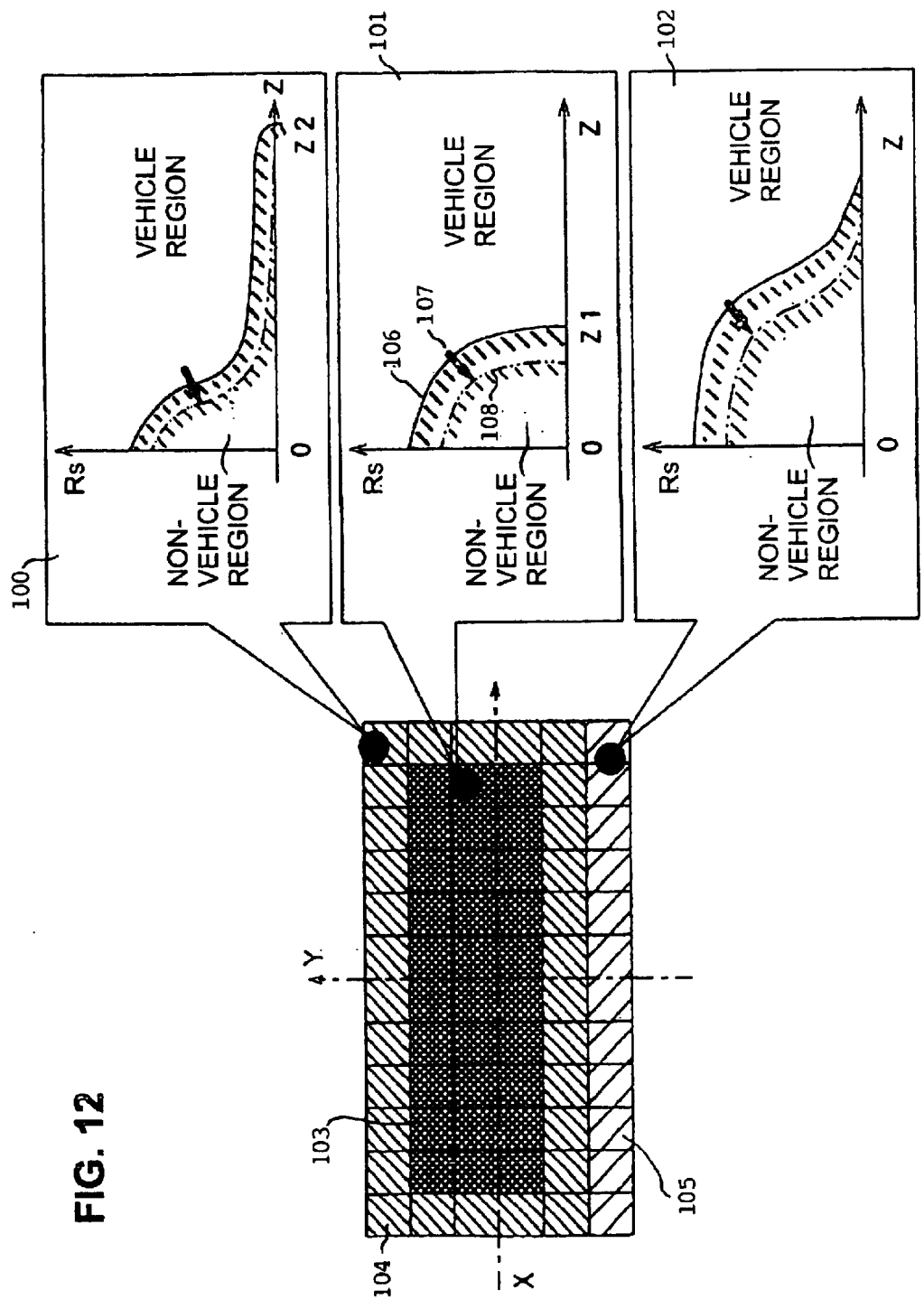

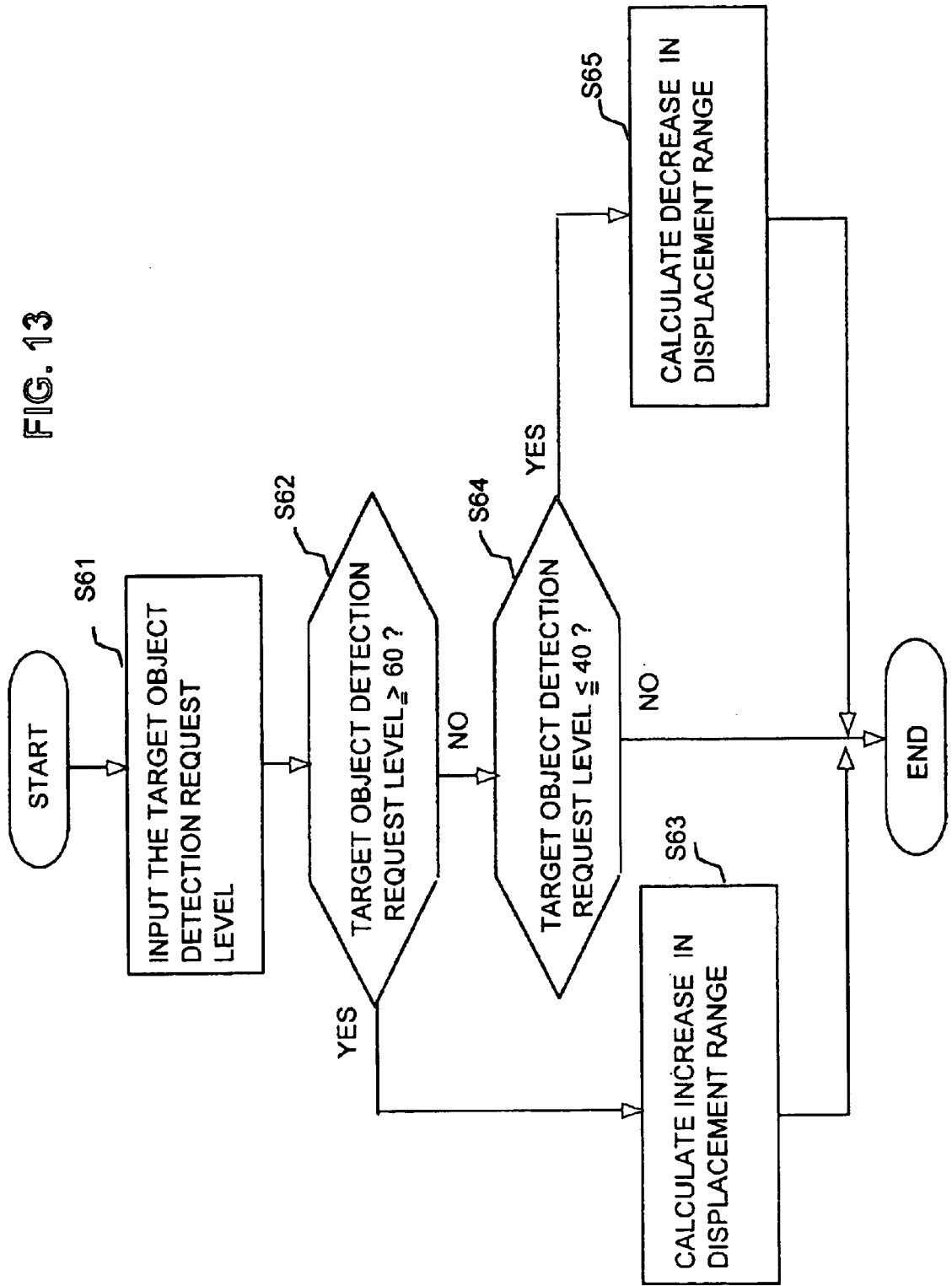

$$\text{CONNECTIVITY CONDITIONS} : \begin{cases} \Delta X < 0.2m \\ \Delta Z < 2m \end{cases}$$

CRUISE CONTROL APPARATUS PERFORMING AUTOMATIC ADJUSTMENT OF OBJECT RECOGNITION PROCESSING IN RESPONSE TO DRIVER ACTIONS RELATING TO VEHICLE SPEED ALTERATION

BACKGROUND OF THE INVENTION

1. Field of Application

The present invention relates to a cruise control apparatus having a vehicle separation control function, for enabling a controlled vehicle (referred to herein as the "host vehicle") to follow a preceding vehicle. The invention further relates to a cruise control apparatus having a fixed-speed control function whereby the host vehicle can be controlled to run at a fixed speed as determined by a presettable speed value, and to an adaptive cruise control apparatus incorporating both of these control functions.

2. Description of Prior Art

In the prior art, types of vehicle separation control apparatus are known which are intended to increasing driving safety and decrease the burden on the vehicle driver. With such a vehicle separation control apparatus, the host vehicle can automatically follow a specific preceding vehicle, within a fixed range of vehicle speeds. Another type of vehicle control apparatus is known whereby a driver can set a desired speed value, within a predetermined range, with the host vehicle being controlled to run at that speed. In addition, an adaptive type of cruise control system is known whereby, when cruise control operation has been selected by the driver, the system automatically selects the appropriate mode. That is to say, when the system detects that there is a preceding vehicle, the host vehicle is controlled to follow the preceding vehicle with a specific separation distance, which may be determined in accordance with the vehicle speed, while if no preceding vehicle is located, or if the preceding vehicle cannot be followed, then the host vehicle is controlled to run at a fixed speed which can be preset by the driver. In the following, unless otherwise indicated, the term "cruise control apparatus" is to be understood as referring to an apparatus which implements such a type of adaptive cruise control.

The term "preceding vehicle (of a host vehicle)" as used in the following description and in the appended claims is to be understood as signifying a vehicle which is located on the travel path of the host vehicle, ahead of the host vehicle, with no intervening vehicle, and which meets predetermined conditions of distance and speed in relation to the host vehicle.

With such a cruise control apparatus, external objects which are located ahead of the host vehicle are detected by radar, and a preceding vehicle (if any) is selected from among those detected objects which are estimated to be vehicles. The cruise control apparatus then applies acceleration and deceleration control in accordance with the inter-vehicle distance and relative speeds of the preceding vehicle and host vehicle, such as to maintain as specific separation distance. However, depending upon the environment of the host vehicle, its running condition etc., it is possible that a preceding vehicle may not be correctly recognized. Specifically, it is possible that an object such as a guard rail or signboard, etc., may be detected and erroneously recognized as a vehicle.

In selecting a vehicle as being a preceding vehicle (as defined above), the value of the probability factor that the preceding vehicle is in the same lane as the host vehicle, the time at which the object was detected, etc., may be used as judgement parameters used in the selection process. However, errors in selecting a detected object as being a preceding vehicle do occur, in practical operation.

If the conditions for selecting a preceding vehicle are made too severe, in order to lower the occurrence of detection errors, then this may result in failure to detect some vehicles, i.e., a preceding vehicle may not be correctly selected from among one or more detected objects. It can thus be understood that it is difficult to perform reliable object recognition processing to detect a preceding vehicle, if such processing is based only upon analysis of radar detection data.

That is to say, in the prior art it has been necessary to:
(a) balance the danger of failure to recognize an object which could be a preceding vehicle against the danger of erroneous recognition (e.g., erroneously judging that reflected light from part of a road surface is from an object which could be a vehicle), and
(b) balance the danger of failure to correctly select one of a set of one or more detected objects as being a preceding vehicle (which could result in a collision), against the danger of erroneously selecting an object as being a preceding vehicle (which may result in the host vehicle being controlled to run at an excessively low speed).

SUMMARY OF THE INVENTION

It is an objective of the present invention to provide an improved cruise control apparatus to be installed on a host vehicle, having improved capabilities for recognition of radar-detected objects as vehicles and improved capability for selecting a detected object as being a vehicle which is preceding the host vehicle. Basically, the invention achieves these objectives by detecting when the driver of the host vehicle performs one of a set of predetermined actions which may indicate an intention to decelerate or accelerate the vehicle, such as depressing the brake pedal or accelerator pedal, and, when appropriate, utilizing that information in conjunction with the current operating conditions of the host vehicle to modify the object detection processing or the preceding vehicle selection processing (or both of these) executed by the cruise control apparatus.

More specifically, according to one aspect, the invention provides a cruise control apparatus whereby when the driver of a host vehicle performs one of a set of predetermined deceleration command actions while the cruise control apparatus is controlling the vehicle to run at a preset fixed speed (i.e., cruise control is in operation, and no preceding vehicle is currently recognized by the cruise control apparatus), an adjustment means of the cruise control apparatus responds to that action of the drive by rendering it easier for an object recognition means of the cruise control apparatus to detect objects and/or easier for a preceding vehicle selection means of the cruise control apparatus to select one of a set of detected objects as being a preceding vehicle.

A "deceleration command action" can for example consist of depressing the brake pedal of the host vehicle, or performing an actuation to reduce a stored value of preset speed, or performing an actuation to cancel the cruise control operation. There is a high probability that if the driver performs such a deceleration command action while the host vehicle is being controlled to run at fixed preset speed by the cruise control apparatus, the action is performed because the driver has perceived a preceding vehicle, which has not yet been recognized by the cruise control apparatus. In that condition, it is advantageous to increase the probability of an actual preceding vehicle being recognized by the cruise control apparatus.

In that way, the invention enables the cruise control apparatus to function more effectively, by utilizing the cognitive abilities of the vehicle driver in conjunction with the object recognition and preceding vehicle selection capabilities of the cruise control apparatus itself.

The concept "rendering it easier for the object recognition means to recognize objects", as used herein, signifies "adjusting the operation of the object recognition means such as to reduce the possibility of failure to recognize an object which actually is a vehicle, while, conversely, increasing the possibility of erroneous recognition". The concept "rendering it more difficult for the object recognition means to recognize objects", as used herein, signifies "adjusting the operation of the object recognition means such as to reduce the possibility of erroneous recognition, while, conversely, increasing the possibility of failure to recognize an object which is actually a vehicle".

Similarly, the concept "rendering it easier for the preceding vehicle selection means to select a preceding vehicle", as used herein, signifies "adjusting the operation of the preceding vehicle selection means such as to reduce the possibility of failure to correctly select one of a set of detected objects as being a preceding vehicle, while, conversely, increasing the possibility of erroneous selection". The concept "rendering it more difficult for the preceding vehicle selection means to select a preceding vehicle", as used herein, signifies "adjusting the operation of the preceding vehicle selection means such as to reduce the possibility of erroneous selection of one of a set of objects as being a preceding vehicle, while, conversely, increasing the possibility of failure to correctly select an object which actually is a preceding vehicle".

According to another aspect, if the host vehicle driver performs one of a set of predetermined acceleration command actions while the cruise control apparatus is controlling the host vehicle to run with a fixed separation distance from a preceding vehicle, then the adjustment means of the cruise control apparatus applies adjustment whereby it is made more difficult for the cruise control apparatus to recognize objects and/or more difficult to select a detected object as being a preceding vehicle. If the driver performs an acceleration command action, such as depressing the accelerator pedal of the host vehicle, while the cruise control apparatus is controlling the host vehicle to run with a fixed separation from a preceding vehicle, then this will generally indicate that the driver perceives that in fact there is no preceding vehicle which is located close to the host vehicle. That is to say, in such a condition, it is likely that the cruise control apparatus is incorrectly detecting and selecting a non-vehicle object as being a preceding vehicle, or is selecting an inappropriate vehicle (for example, on a multi-lane highway, a vehicle which is running in an adjacent lane to that of the host vehicle).

In order to reduce the probability of such erroneous detection or selection occurring in such a case therefore, with the present invention, it is made more difficult for the cruise control apparatus to recognize objects and/or more difficult to select a detected object as being a preceding vehicle. Thus here again, the cognitive abilities of the host vehicle driver are applied to augment the capabilities of the cruise control apparatus itself.

According to another aspect, if the cruise control apparatus should continuously detect the same object as being a preceding vehicle for at least the duration of a predetermined time interval, while the host vehicle is being controlled by the cruise control apparatus to run with a fixed separation distance from a preceding vehicle, then the adjustment means of the cruise control apparatus renders it easier for the cruise control apparatus to detect objects and/or easier to select one of a set of detected objects as being a preceding vehicle. This reflects the fact that if the same object is continuously selected by the cruise control apparatus as a preceding vehicle for an appreciable time duration, i.e., the host vehicle driver has not performed any action which would terminate operation in the vehicle-following control mode for that time duration, then this indicates that the driver believes such a control mode to be appropriate for the current driving condition of the host vehicle. Hence it is very probable that there is an actual preceding vehicle. Thus with the present invention in such a case, it is rendered easier for the cruise control apparatus to continue to recognize that preceding vehicle. The cognitive abilities of the host vehicle driver are thereby again applied to augment the detection/selection capabilities of the cruise control apparatus.

According to another aspect, if the host vehicle driver initiates control operation by the cruise control apparatus, and also a set of basic conditions relating to the relative position and relative speed of a (currently recognized) preceding vehicle are not satisfied, then the adjustment means of the cruise control apparatus applies adjustment whereby it is made more difficult for the cruise control apparatus to recognize objects and/or more difficult to select a detected object as being a preceding vehicle.

This reflects the fact that it is unlikely that the host vehicle driver would initiate cruise control operation under a condition in which there actually is a preceding vehicle that is running closely ahead of the host vehicle, i.e., under a condition in which the cruise control system would be required to immediately enter the control mode for following a preceding vehicle at a fixed separation distance. Thus in such a case, since it is highly unlikely that there actually is a closely adjacent preceding vehicle, it is made more difficult for the cruise control apparatus to recognize objects or select an object as being a preceding vehicle, i.e. the probability of erroneous selection of an object as being a preceding vehicle is reduced.

The invention proposes two basic methods of implementing the functions of the aforementioned adjustment means, i.e., adjustment to render selection of a detected object as a preceding vehicle easier or more difficult, and adjustment to render detection of an object easier or more difficult. The disclosure proposes the following specific techniques for rendering selection of a preceding vehicle easier or more difficult.

Firstly, the cruise control apparatus can be configured to judge the degree of probability that a detected object is located in the same vehicle lane as the host vehicle (that degree of probability being referred to herein as the in-lane probability factor) and with the magnitude of that in-lane probability factor being used by the preceding vehicle selection means of the cruise control apparatus as a factor in judging whether or not a detected object is a preceding vehicle. Specifically (when travel is along a straight path) the greater the extent to which the position of a detected object is displaced to the right or left of the advancement direction of the host vehicle, the lower will be the in-lane probability factor of that object. In that case, the aforementioned adjustment for rendering selection of a preceding vehicle more difficult can be achieved by reducing each derived value of in-lane probability factor. That is to say, if there is a low probability that a detected object is in the same lane as the host vehicle, then it is less likely that the object would be selected as a preceding vehicle by the preceding vehicle selection means of the cruise control apparatus. Conversely, the adjustment for rendering selection of a preceding vehicle easier can be performed by increasing each derived value of in-lane probability factor.

In particular, the preceding vehicle selection means can be configured to judge whether or not the in-lane probability factor derived for an object is greater than a predetermined threshold value. That is, if the threshold value is exceeded, then it is more likely that the object would be selected as a preceding vehicle by the preceding vehicle selection means. Thus, the aforementioned operation of performing adjustment to render it easier for the preceding vehicle selection means to select an object as a preceding vehicle can be implemented by lowering that threshold value. Conversely, the aforementioned adjustment for rendering selection of a preceding vehicle more difficult can be performed by increasing that threshold value.

Secondly, the cruise control apparatus can be configured to judge the degree of probability that a detected object is a vehicle (that degree of probability being referred to herein as the vehicle probability factor), based upon information such as the duration for which the object has been detected, the estimated shape of the object, etc., with the magnitude of that vehicle probability factor being used by the preceding vehicle selection means of the cruise control apparatus as a factor in judging whether or not a detected object is a preceding vehicle. In that case, the adjustment for rendering selection of a preceding vehicle more difficult can be achieved by reducing each derived value of vehicle probability factor. That is to say, if there is a low value of vehicle probability factor derived for a detected object, then it is less likely that the object would be selected as a preceding vehicle by the preceding vehicle selection means of the cruise control apparatus. Conversely, the adjustment for rendering selection of a preceding vehicle easier can be performed by increasing each derived value of vehicle probability factor.

In particular, the preceding vehicle selection means can be configured to judge whether or not the vehicle probability factor derived for an object is greater than a predetermined threshold value, and to use the result of that judgement as a factor in selecting an object as being a preceding vehicle. That is, if the threshold value is exceeded, then it is more likely that the object would be selected as a preceding vehicle by the preceding vehicle selection means. Thus, the aforementioned operation of performing adjustment to render it easier for the preceding vehicle selection means to select an object as a preceding vehicle can be implemented by lowering that threshold value. Conversely, the adjustment for rendering selection of a preceding vehicle more difficult can be performed by increasing that threshold value.

In addition, the cruise control apparatus can be configured such that the adjustment means applies adjustment as described above only to the selection processing of a specific object, i.e., an object which is currently selected by the preceding vehicle selection means as being a preceding vehicle. That can be advantageous under certain circumstances, e.g., when the object is reflecting back an excessively high level of light, so that erroneous selection may readily occur, and hence continued selection of the object as a preceding vehicle should be made more difficult.

The disclosure further proposes the following specific techniques for rendering recognition of an object, by the object recognition means of the cruise control apparatus, easier or more difficult.

Firstly, the object recognition means receives reflected electromagnetic waves (where the term "electromagnetic waves" as used herein has a broad significance, covering both light waves and radio waves) and derives a corresponding received signal, with the reflected waves being judged to be from an object if the received signal strength is above a predetermined threshold value. Thus, recognition of an object (i.e., determining that received electromagnetic waves are reflected from an actual physical object) can be made easier or more difficult by lowering or increasing that threshold value, respectively.

Secondly, a map of detection parameter values can be established, which defines a region (i.e., 2-dimensional continuum of combinations of detection parameter values, such as combinations of received signal strength values and estimated range values) which is separated into a first area which corresponds to a "valid object" condition and a second area which corresponds to a "non-valid object". That is to say, if a combination of detection parameters are obtained which correspond to a point in the first area, then that combination is assumed to correspond to an actual object (or to a specific type of object, e.g., a vehicle). In that case, the line of separation between these two areas can be considered as a continuum of threshold values. Hence, threshold value adjustment can be performed such as to increase the likelihood that a combination of parameter values will corresponding to the "valid object" category, or to decrease that likelihood. Thus, adjustment can be performed to render it easier or more difficult for the object recognition means to recognize an object.

The disclosure proposes various other techniques for adjustment for rendering object recognition by the object recognition means of the cruise control apparatus easier or more difficult, as is described in detail in the following description of embodiments.

BRIEF DESCRIPTION OF THE DRAWINGS

FIGS. 1A and 1B constitute a general system block diagram of an embodiment of a cruise control system according to the present invention;

FIG. 2 is a flow diagram showing a main processing routine which is periodically executed by a vehicle separation ECU of the embodiment;

FIG. 3 is a flow diagram showing a preceding vehicle selection subroutine which is executed as part of the main routine of FIG. 2;

FIG. 7 is a flow diagram showing a lever actuation handling processing subroutine which is executed as part of the subroutine of FIG. 6B;

FIG. 8A is a flow diagram showing a pedal actuation handling processing subroutine which is executed as part of the subroutine of FIG. 6B;

FIG. 10 is a flow diagram of a main processing routine which is periodically executed by a radar sensor apparatus of the embodiment;

FIG. 11A is a flow diagram showing a non-vehicle judgement threshold value calculation subroutine which is executed as part of the routine of FIG. 10;

FIG. 11B is a flow diagram showing a non-vehicle judgement subroutine which is executed as part of the routine of FIG. 10;

FIG. 12 is a diagram for use in describing a non-vehicle judgement map which is used in the subroutine of FIG. 11B;

FIG. 13 is a flow diagram showing a target object estimated displacement range calculation subroutine which is executed as part of the routine of FIG. 10;

DESCRIPTION OF PREFERRED EMBODIMENTS

Figure 1B:
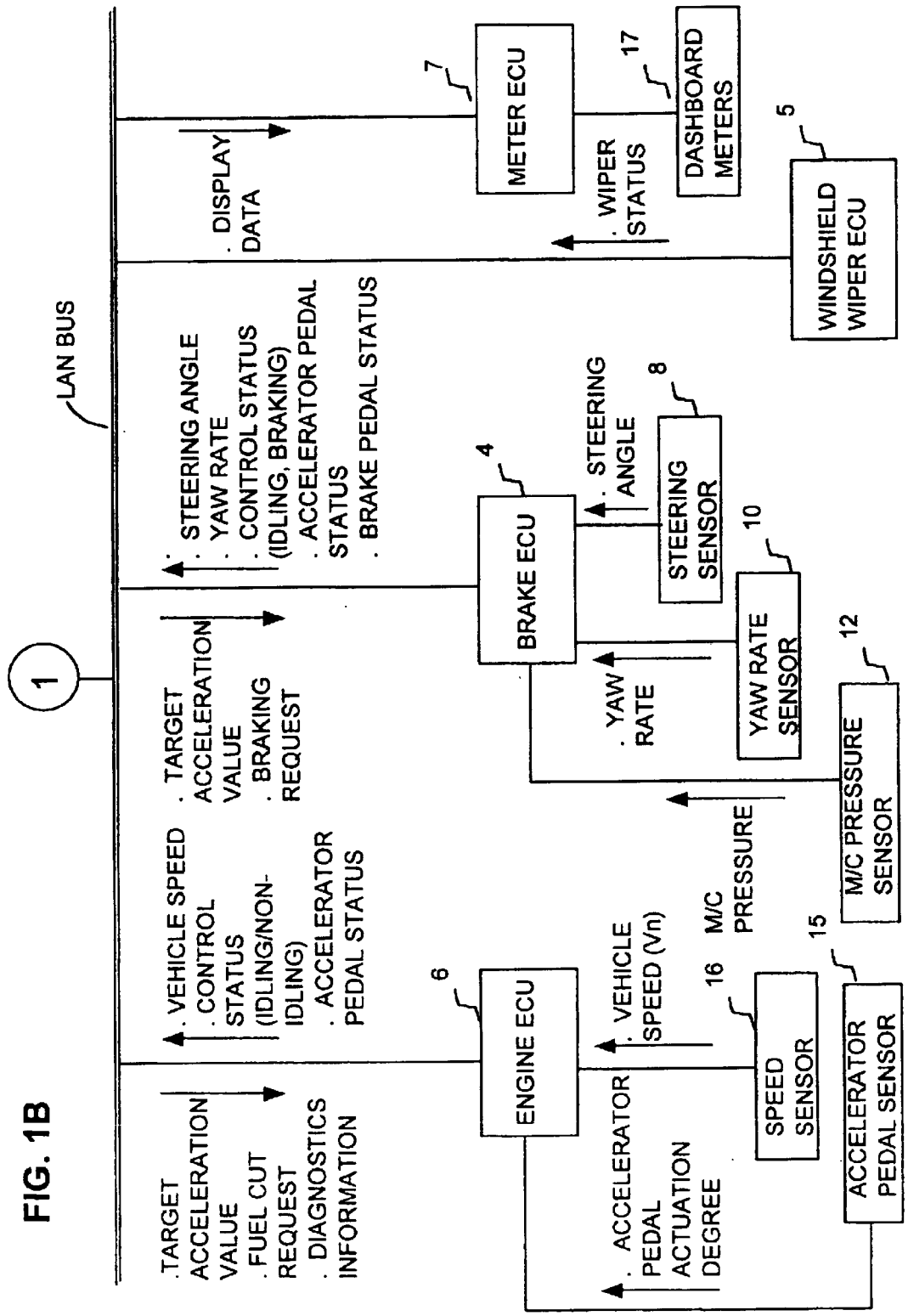

FIG. 1 is a general system block diagram of a cruise control system according to the present invention. (In the following it should be understood that, unless otherwise indicated, "the system" refers to the cruise control system which is being described). The system is based on a vehicle separation control electronic control unit 2 (with "electronic control unit" being abbreviated to ECU in the following), which is connected to a brake ECU 4, a windshield wiper ECU 5, a engine ECU 6, and a meter ECU 7 via a LAN (Local Area Network) data communication bus, and is further connected directly to cruise control switches 20, a target vehicle separation setting switch 22, a warning buzzer 14 and a vehicle separation control ECU 2. Data communication between the ECUs of this embodiment via the LAN communication bus is performed using the CAN (Controller Area Network) protocol (proposed by the Robert Bosch company, Germany) which is commonly used in automobile data communication networks.

The radar section 3 incorporates a laser type of optical scanning radar apparatus functioning as a scanning rangefinder (which generates relative speed and direction information in addition to range information) in combination with a microcomputer which processes the range, speed and direction information. More specifically, the scanning rangefinder periodically performs a laser beam scan operation consisting of a plurality of azimuth scans (each within a fixed angular range, directed ahead of the vehicle) at successively different angles of elevation. Variations in strength of the received signal obtained from the resultant reflected light are analyzed, to generate a 3-dimensional mathematical model (referred to herein as a target object) of any object that may constitute a vehicle, and to determine the relative distance and direction of each target object.

That information is then used in conjunction with information specifying the current speed of the host vehicle and the radius of curvature of the vehicle path, etc., (received from the vehicle separation control ECU 2) to compute, for each target object, the degree of probability that it is located on the same travel path as the host vehicle (that probability degree being referred to herein as the in-lane probability factor) and transmits that information together with the distance, relative speed, etc., of each target object, to the vehicle separation control ECU 2.

In addition, the radar section 3 transmits diagnostics information relating to its own functioning, to the vehicle separation control ECU 2. Although the radar apparatus of this embodiment utilizes a scanning rangefinder which performs scanning with a laser light beam, and determines the distance between a preceding vehicle and the host vehicle based on analysis of received signals which are derived from resultant reflected light, it would be equally possible to utilize other types of a object detection apparatus, such as a radar apparatus which performs scanning by millimeter-wave radio waves.

It is an essential feature of this embodiment that the vehicle separation control ECU 2 transmits to the radar section 3 the current values of control quantities, designated as the sensor detection request level and the target object detection request levels, which are calculated by the vehicle separation control ECU 2 as described hereinafter. Basically, the object recognition processing performed by the radar section 3 is adjusted in accordance with the sensor detection request level to render recognition of any target objects (i.e., which have not yet been recognized) either easier or more difficult.

On the other hand, respective values of target object detection request level are derived by the vehicle separation control ECU 2 for each of one or more target objects which have already been recognized by the radar section 3, and the object recognition processing is adjusted for each specific target object in accordance with the corresponding target object detection request level, such as to render continued recognition of that target object either easier or more difficult.

The brake ECU 4 is based on a microcomputer, which receives information from the steering sensor 8 which indicating the steering angle of the host vehicle, receives information from the yaw rate sensor 10 indicating the yaw rate of the vehicle, and transmits information specifying the brake pedal status to the vehicle separation control ECU 2 via the LAN communication bus. The brake pedal status information is derived from a master cylinder pressure signal that is supplied from a master cylinder pressure sensor 12, expressing the status of an actuator which controls an increase-pressure control valve and decrease-pressure control valve in the brake hydraulic circuit, for controlling the brake pressure.

The engine ECU 6 is based on a microcomputer, which receives sensor signals from a vehicle speed sensor 16 that detects the current speed of the host vehicle and from an accelerator pedal which detects the degree of actuation of the accelerator pedal. Based on these sensor signals, the engine ECU 6 transmits data expressing the current vehicle speed, the control status of the engine (i.e., which may be an idling status, or the engine may be in a condition of being controlled to run the vehicle at a target speed) and the accelerator pedal status (i.e., expressing the degree to which the driver is currently depressing the accelerator pedal) to the vehicle separation control ECU 2. The engine ECU 6 receives, from the vehicle separation control ECU 2, data expressing a target acceleration value, diagnostics information, etc., and judges the current operating condition of the engine based on all of these data. The engine ECU 6 thereby outputs drive commands, in accordance with that current operating condition, to a throttle actuator (not shown in the drawing) that controls the degree of opening of the throttle valve of the engine, which is assumed in this embodiment to be a gasoline-powered engine.

The windshield wiper ECU 5 controls driving of the windshield wipers, and sends windshield wiper switch information to the vehicle separation control ECU 2. The meter ECU 7 controls the dashboard meters 17 to display various information such as the vehicle speed, the engine speed of rotation, the open/close status of the doors, the shift range of the gearbox, etc.

The vehicle separation control ECU 2 receives the control status signals described above from the engine ECU 6, and also receives from the brake ECU 4 data expressing the steering angle, yaw rate, brake control, etc., and data expressing the windshield wiper status from the windshield wiper ECU 5. In addition as described above, the vehicle separation control ECU 2 receives information transmitted from the radar section 3 concerning any target objects which have been recognized by the radar section 3 (each of which may represent a vehicle, and one of which may represent a preceding vehicle), with the information including, for each of the target objects, the aforementioned in-lane probability factor, the distance and the relative speed of the target object. Based on that information, the vehicle separation control ECU 2 determines whether there is a target object which is estimated to be a preceding vehicle, for which it is necessary to apply inter-vehicle separation distance control.

If it is found that there is such a preceding vehicle, and the host vehicle is currently operating under cruise control (i.e., the driver has previously actuated the cruise control switches 20 to send a "cruise set" command to the vehicle separation control ECU 2) then the vehicle separation control ECU 2 generates control commands for accelerating or decelerating the host vehicle such as to appropriately adjust the distance between the host vehicle and the preceding vehicle. These control commands may specify a target value of acceleration or deceleration and/or or a fuel cut request, transmitted together with diagnostics information to the engine ECU 6, while in addition a control command specifying braking request data, etc., may be transmitted to the brake ECU 4, and display data may be transmitted to the meter ECU 7. In addition, the vehicle separation control ECU 2 judges whether or not it is necessary to generate an audible warning, and if so, sends a command to the warning buzzer 14 to cause an audible warning to be emitted.

The cruise control switches 20 are made up of a "cruise set" switch which is operated by means of a cruise set lever, a "cruise cancel" switch which is operated by means of a cruise cancel lever, a "set vehicle speed fine adjustment increase" switch, a "set vehicle speed fine adjustment decrease" switch, etc. The "cruise set" switch is actuated to begin automatic cruise control operation, when the main switch is in the ON state. The "cruise cancel" switch is actuated to terminate cruise control operation.

In general, the "set vehicle speed fine adjustment increase" switch is operated by a lever referred to as the accelerator lever, i.e., when the accelerator lever is actuated, the switch is set ON, whereby a stored value of set vehicle speed (i.e., stored in a memory of the vehicle separation control ECU 2, not shown in the drawings) is gradually increased. The "set vehicle speed fine adjustment decrease" switch is generally operated by a lever referred to as the coast lever, i.e., when the coast lever is actuated, the switch is set ON, whereby the stored value of set vehicle speed is gradually decreased.

During cruise control operation, the target vehicle separation setting switch 22 can be used by the driver to input to the vehicle separation control ECU 2 information for setting a target time interval (referred to in the following as the target vehicle separation interval) which is a time interval corresponding to a target value of inter-vehicle distance between a preceding vehicle and the host vehicle at the current vehicle speed. The target vehicle separation interval can be set within a predetermined range of values, and the current set value is held stored in the vehicle separation control ECU 2.

FIG. 2 is a flow diagram of a main processing routine which is periodically executed by the vehicle separation control ECU 2. First in step S100, data, including information concerning target objects, are received from the radar section 3. The processing executed by the radar section 3 is described in detail hereinafter. Next, in step S200, CAN data (i.e., data which are transferred using the aforementioned CAN protocol) relating to various aspects of the current operating condition of the vehicle are received from the brake ECU 4, the windshield wiper ECU 5 and the engine ECU 6. Specifically, data expressing the current vehicle speed, the engine control status, the steering angle, the yaw rate, brake control status, and windshield wiper status, etc., are received.

These received data are utilized by the vehicle separation control ECU 2 in executing subroutines for preceding vehicle selection (S300), calculation of target acceleration value (S400), judgement of deceleration request (S500), and determination of the sensor detection request level and target object detection request level (S600). These will be described in detail hereinafter. Next, the estimated radius of curvature R of the vehicle path is calculated (S1100), and data expressing the current vehicle speed, the estimated radius of curvature R, the sensor detection request level (described hereinafter), and object detection request levels (described hereinafter) for respective objects, are transmitted to the radar section 3 (S1200). CAN data expressing the target acceleration value, braking request, fuel cut request, diagnostics information, display data, etc., are then transmitted to the brake ECU 4, the engine ECU 6 and the meter ECU 7.

In the following, the above subroutines S300, S400, S500 and S600 of the main processing routine shown in FIG. 2 will be described in detail. Firstly, the preceding vehicle selection subroutine of S300 will be described, referring to the flow diagram of FIG. 3.

In the aforementioned step S100, the radar section 3 sends to the vehicle separation control ECU 2 data expressing a set of one or more target objects (i.e., each of which has been judged to be a vehicle) together with, for each of these target objects, information which can be used in judging whether or not that target object is a candidate for being a preceding vehicle. In step S310 of FIG. 3, the data received from the radar section 3 in step S100 are examined to extract the data concerning each target object (if any) which is a candidate for being a preceding vehicle.

Next in step S320, a decision is made as to whether or not there is at least one target object which is a candidate for being a preceding vehicle. If so (YES decision in step S320), then step S330 is executed.

With this embodiment, the radar section 3 perform internal processing of signals which are received by the radar apparatus expressing reflected light levels, to:
(a) detect external objects (specifically, regions which reflect back levels of radar-transmitted light that are above predetermined values)
(b) recognize sets of objects which constitute respective target objects (i.e., can be assumed to correspond to respective vehicles)
(c) for each target object, derive information which can be used by the vehicle separation control ECU 2 in judging whether or not that target object is a candidate for being a preceding vehicle. With this embodiment, this information expresses the degree of probability that the target objects is in the same lane as the host vehicle. that is above a predetermined threshold value. For brevity of description, the probability factor of a target object being in the same lane as the host vehicle will be referred to as the "in-lane probability factor" for that target object.

The radar section 3 then transmits to the vehicle separation control ECU 2, together with data expressing each target object, the in-lane probability factor obtained for that target object. In step S310 of FIG. 3, the vehicle separation control ECU 2 compares the in-lane probability factor corresponding to each target object with a predetermined in-lane probability factor threshold value. If that threshold value is exceeded, then the corresponding target object is classified as being a candidate for being a preceding vehicle.

With this embodiment, the threshold value used by the vehicle separation control ECU 2 for judging the in-lane probability factor for a target object is fixedly predetermined. However it would be equally possible to configure the embodiment such that the in-lane probability factor threshold value is adjusted in accordance with the sensor detection request level. In that way, the selection of a preceding vehicle by the vehicle separation control ECU 2 will be made easier or more difficult, in accordance with the sensor detection request level. That is to say, if the in-lane probability factor threshold value is made smaller than its normal (i.e., default) value, then it is made easier for the vehicle separation control ECU 2 to select a preceding vehicle (i.e., the operation will be weighted towards increasing the number of target objects that are extracted as candidates for preceding vehicle, in step S310). Conversely, if the in-lane probability factor threshold value is made higher than its normal value, it is thereby rendered accordingly more difficult for the vehicle separation control ECU 2 to select a preceding vehicle (i.e., the operation will become weighted towards decreasing the number of target objects that are extracted as candidates for preceding vehicle).

Alternatively, instead of altering the in-lane probability factor threshold value, the vehicle separation control ECU 2 (or radar section 3) can be configured to achieve the same effect by applying weighting to the obtained in-lane probability factors, i.e., to increase each in-lane probability factor by the same amount or to decrease each factor by the same amount, in accordance with the sensor detection request level.

It should be noted that it would also be possible as an alternative configuration of this embodiment for the radar section 3 to derive, for each target object, a value of "vehicle probability factor", which expresses the degree of probability that the target object is a vehicle). In that case, the respective vehicle probability factors for the target objects could be transmitted to the vehicle separation control ECU 2 in addition to the in-lane probability factor, for use in extracting those target objects which are candidates for being a preceding vehicle.

That is to say, with such an alternative configuration of the embodiment, only if it is found that the in-lane probability factor for a target object is above the in-lane probability factor threshold value while in addition the vehicle probability factor for that object is also above a predetermined vehicle probability factor threshold value, in step S310, then data concerning that object would be entered into the group of preceding vehicle candidates. That would serve to reduce the possibility of an object other than a vehicle being selected as a preceding vehicle, by comparison with a method in which only the in-lane probability factor is utilized.

Furthermore in that case, in the same way as for the in-lane probability factor, it would be possible to alter the threshold value used by the vehicle separation control ECU 2 in judging the vehicle probability factors in step S310, in accordance with the sensor detection request level.

That is to say, if the vehicle probability factor threshold value used by the vehicle separation control ECU 2 is thereby made lower than its normal (i.e., default) value, it is made easier for the vehicle separation control ECU 2 to select a preceding vehicle, since the number of target objects that are extracted as candidates for preceding vehicle will be increased. Conversely, if the threshold value used for judging the vehicle probability factor is made higher than its normal value, it is made more difficult for the vehicle separation control ECU 2 to select a preceding vehicle.

Alternatively, instead of altering the vehicle probability factor threshold value, the vehicle separation control ECU 2 (or radar section 3) can be configured to achieve the same effect by applying weighting to the vehicle probability factors that are obtained by the radar section 3, i.e., to increase each vehicle probability factor by the same amount or to decrease each factor by the same amount, in accordance with the sensor detection request level.

Next, in step S320 of the subroutine of FIG. 3, a decision is made as to whether or not there is at least one candidate preceding vehicle. If there is no candidate preceding vehicle (NO in step S320) then data indicative of that result are set as the preceding vehicle data (S350), and this execution of the subroutine then ends. If there is at least one candidate preceding vehicle (YES in S320) then step S330 is executed in which the target object having the smallest value of distance from the host vehicle is selected as being a preceding vehicle.

Step S340 is then executed in which data concerning the object that is selected in step S330 as being the preceding vehicle are set as the target data. Execution of the subroutine then ends.

Figure 4A:
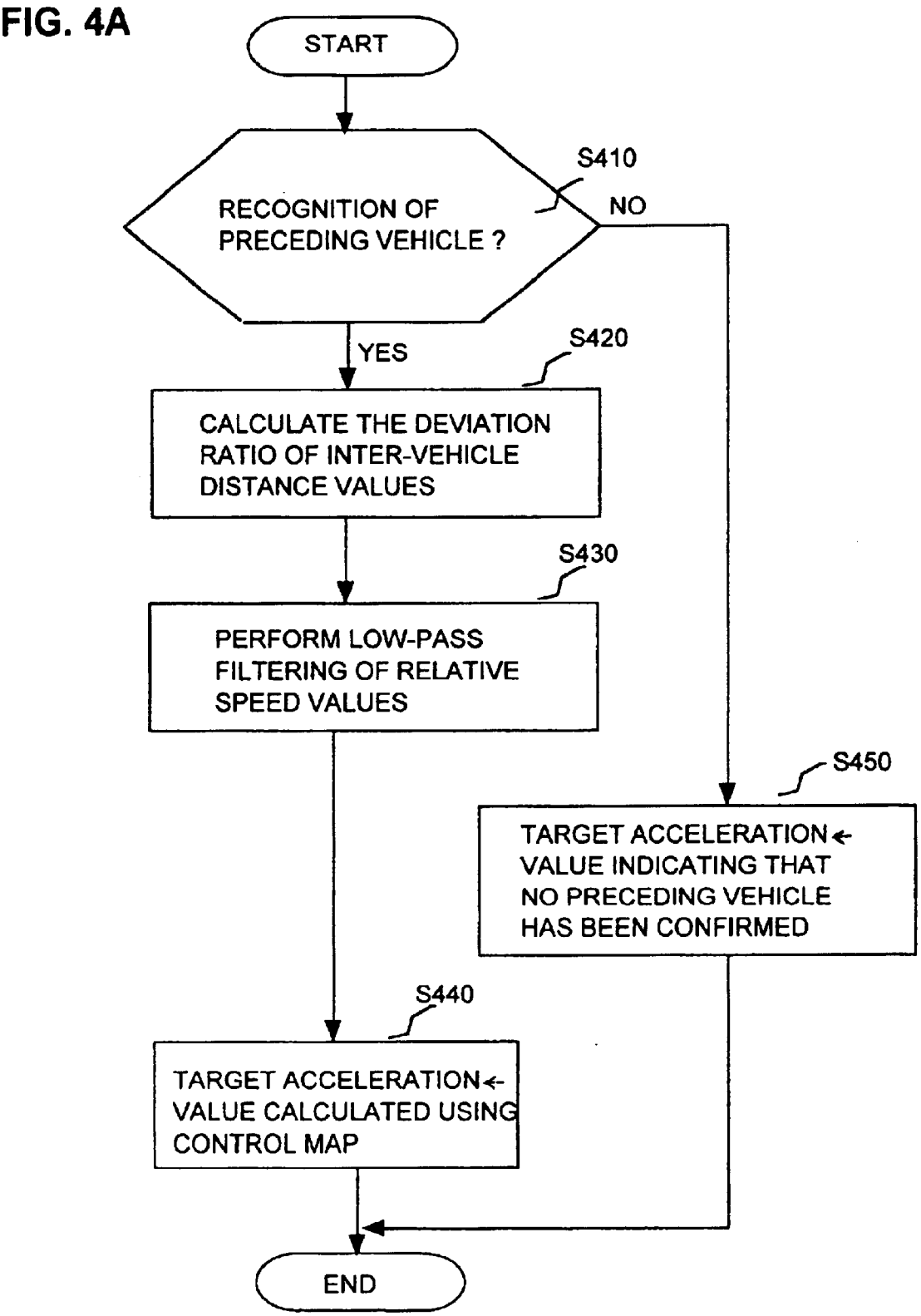
FIG. 4A is a flow diagram showing a target acceleration value calculation subroutine which is executed as part of the main routine of FIG. 2.

The target acceleration calculation subroutine S400 in FIG. 2 will be described referring to the flow diagram of FIG. 4A. Firstly in step S410, a decision is made as to whether or not a preceding vehicle is currently recognized (i.e., has been specified in the preceding execution of the subroutines S300). If so (YES in step S410) step S420 is executed in which the vehicle separation deviation ratio is calculated, as a percentage value. The term "vehicle separation" is used herein for brevity of description to signify the distance between the host vehicle and the preceding vehicle. The vehicle separation deviation ratio is obtained, as a percentage value, by subtracting the target value of vehicle separation from the current value of vehicle separation, to obtain the vehicle separation deviation, dividing that by the target value of vehicle separation, and multiplying the result by 100. Step S430 is then executed in which low-pass filter processing is applied to the value of relative speed between the preceding vehicle and host vehicle, then step S440 is executed.

Figure 4B:
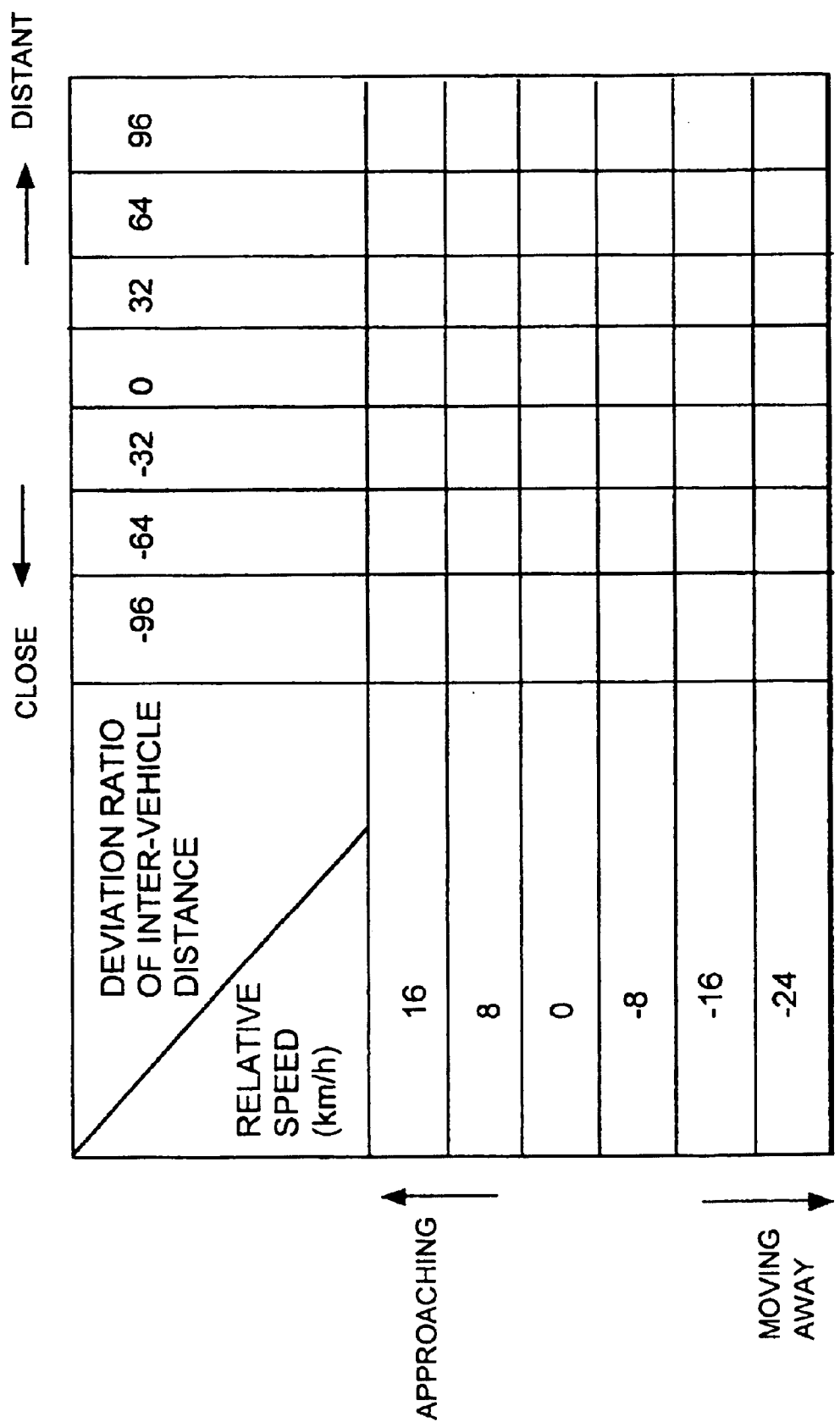
FIG. 4B is a diagram for use in describing a control map which is used in the subroutine of FIG. 4A.

In step S440, based on the two parameters (i.e., vehicle separation and relative speed) which were obtained in steps S420 and S430, a target acceleration value is obtained from the control map shown in FIG. 4B. In this map, values of vehicle separation deviation ratio (%) are shown as −96, −64, −32, 0, 32, 64, 96, i.e. 7 values, while values for relative speed (Km/h) are shown as 16, 8, 0 −8, −16, −24, i.e., 6 values, from which a value of target acceleration ATO can be obtained. Intermediate values, not shown in the map, can be utilized by linear interpolation of the values shown. For input values which exceed the limits of the map, the terminal values of the map are utilized. It should be noted that it would also be possible to apply a guard range, having upper and lower limits, to values which are within the range of the map.

However if no preceding vehicle is currently recognized (NO in step S410) then a value predetermined for indicating that status is set as the target acceleration value (step S450)

Figure 5:
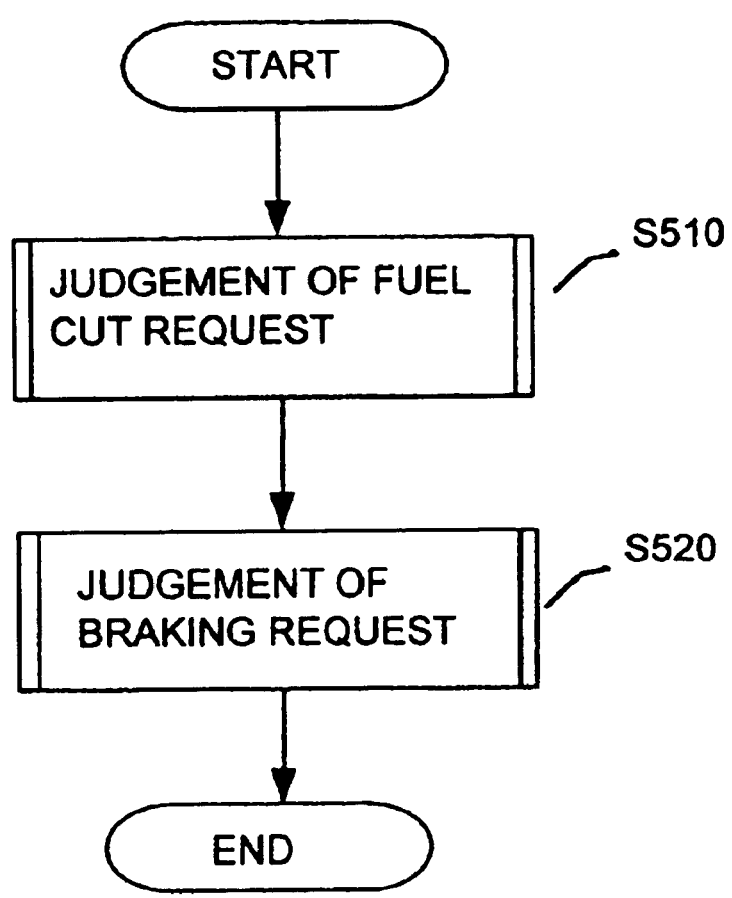
FIG. 5 is a flow diagram showing a deceleration request judgement subroutine which is executed as part of the main routine of FIG. 2.

Next, the deceleration request judgement subroutine (S500 of FIG. 2) will be described referring to the flow diagram of FIG. 5.

The deceleration request judgement subroutine is made up of a fuel cut request judgement subroutine (S510) and a braking request judgement subroutine (S520), which are executed successively.

The fuel cut request judgement subroutine S510 will be briefly described. A decision is made as to whether or not there is currently a fuel cut request (i.e., being issued by the vehicle separation control ECU 2) and if there is currently no request, then a decision is made as to whether or not the acceleration deviation is less than a reference value, designated as Aref11. If the acceleration deviation (i.e., difference between a target value of acceleration which has been established by the vehicle separation control ECU 2, and the actual acceleration) is less than Aref11 then a fuel cut request is generated, while if the acceleration deviation is greater than or equal to Aref11 then no action is taken. However if a fuel cut request is currently being issued, then a decision is made as to whether or not the acceleration deviation is greater than a reference value Aref12, and if it is greater than Aref12 then the fuel cut request is cancelled, while if the acceleration deviation is less than or equal to Aref12 then no action is taken.

The braking request judgement subroutine S920 will be briefly described. A decision is made as to whether or not a fuel cut request is currently being issued by the vehicle separation control ECU 2, and if that is not the case, then if there is currently a braking request, that braking request is cancelled. However if there is currently a fuel cut request being issued, then a decision is made as to whether or not a braking request is currently being issued. If no braking request is currently being issued, then a decision is made as to whether or not the acceleration deviation is smaller than a reference value Aref21. If the acceleration deviation is smaller than Aref21 then a braking request is issued, while if the acceleration deviation is greater than or equal to Aref21, then no action is taken. If however there is currently a braking request then a decision is made as to whether or not the acceleration deviation is greater than or equal to a reference value Aref22. If so, the braking request is cancelled (i.e., that request is not transmitted to the brake ECU 4) while if the acceleration deviation is not greater than or equal to Aref22, then no action is taken.

The above reference values of acceleration deviation Aref11, Aref12, Aref21, Aref22 which are used in the fuel cut request judgement and braking request judgement as described above are thus applied as respective threshold values, as follows:

(a) Aref11 is the threshold value for validating a fuel cut request, while Aref12 is the threshold value for cancelling a fuel cut request, (b) Aref21 is the threshold value for validating a braking request, while Aref22 is the threshold value for cancelling a braking request.

The magnitude relationships between these are as follows:

Aref11<Aref12

Aref21<Aref22

These relationships are necessary to prevent the operation of the vehicle separation control ECU 2 from jittering between the conditions of validating a function request and cancelling a function request.

The relationship between the function validation threshold values for respective deceleration functions are:

0>Aref11>Aref21

This relation is preferable, to ensure that the deceleration function which applies the smaller rate of deceleration will be applied first.

The relationships between function cancellation threshold values for respective deceleration functions are:

Aref12>Aref22>0

This relationship is preferable, to ensure that the function which applies the higher rate of deceleration will be cancelled first.

The subroutine S600 of FIG. 2, executed by the vehicle separation control ECU 2 to determine the sensor detection request level and the target object detection request levels will be described referring to FIGS. 6A to 9. As shown in the flow diagram of FIG. 6A, this subroutine consists of a sensor detection request level judgement subroutine (S700) and a target object detection request level judgement subroutine (S800) which are executed successively. These are described in the following.

Figure 6A:
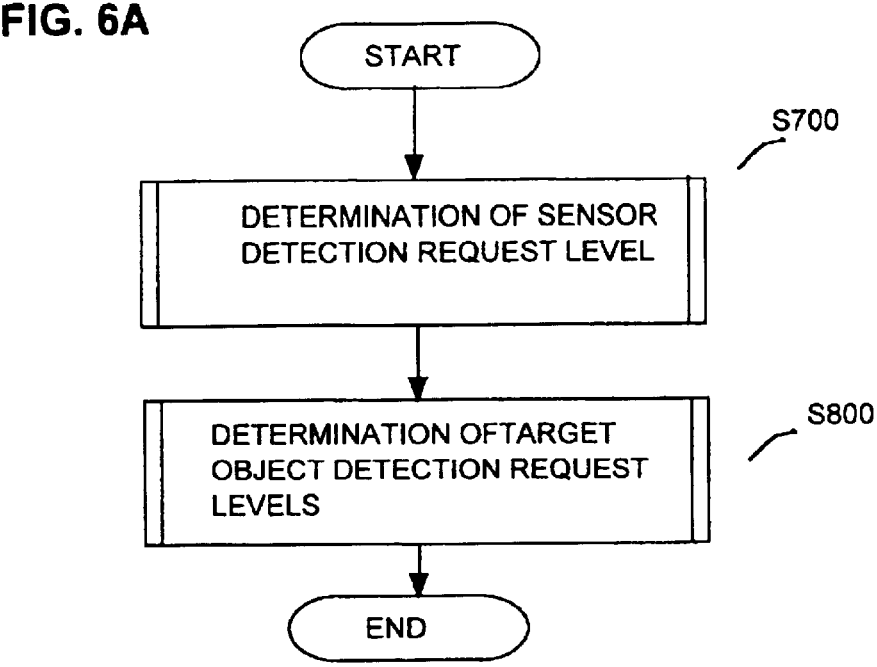
FIG. 6A is a flow diagram showing a detection request judgement subroutine which is executed as part of the main routine of FIG. 2.
Figure 6B:
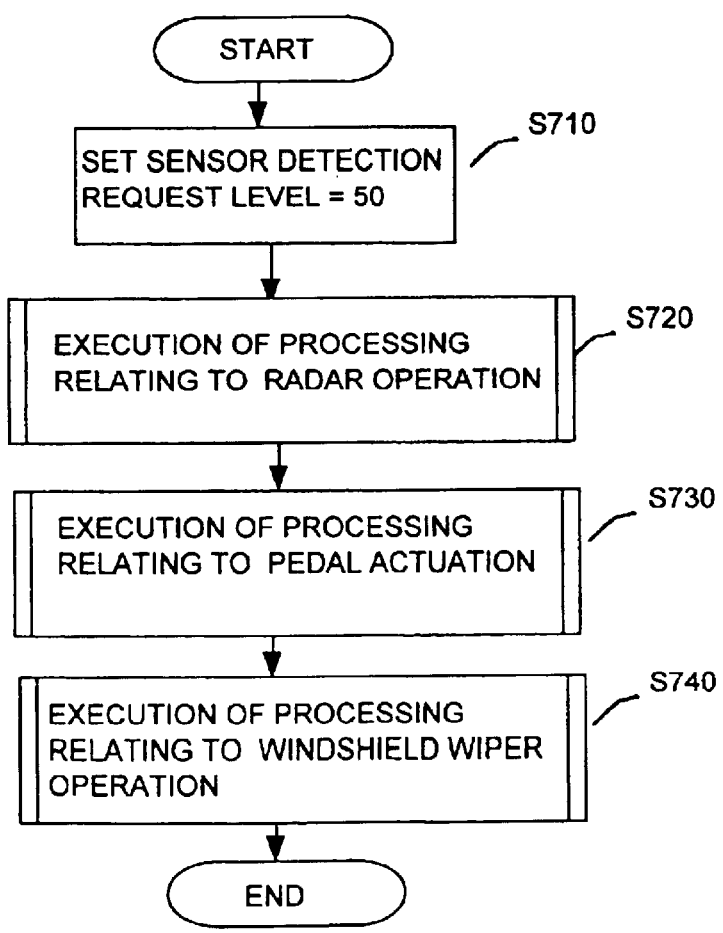
FIG. 6B is a flow diagram showing a sensor detection request level judgement subroutine which is executed as part of the subroutine of FIG. 6A.

In the sensor detection request level judgement subroutine (700) shown in FIG. 6B, firstly an initial value for the sensor detection request level is set as 50 (step S710). Next, a lever actuation handling subroutine (S720), pedal actuation handling subroutine (S720), and windshield wiper operation handling subroutine (S740) are successively executed. The contents of these subroutines S730 to S740 will be successively described in the following.

Lever Actuation Handling Subroutine (S720)

First, in step S721 shown in FIG. 7, a decision is made as to whether or not a preceding vehicle is currently recognized. If there is a preceding vehicle (YES in step S721) a decision is made as to whether or not the accelerator lever has been continuously actuated for at least one second. As described above, such actuation performed by the host vehicle driver has the result of setting the "set vehicle speed fine adjustment increase" switch in the ON state, thereby increasing a set value of vehicle speed that is stored in the vehicle separation control ECU 2, and so causing the vehicle speed to gradually increase. If it is found that the accelerator lever has been actuated continuously for 1 second, then the continuity interval count timer is reset (step S723) and the sensor detection request level is decremented by 10 (step S724). If the accelerator lever has not been actuated continuously for 1 second (NO in step S722) then the subroutine ends, with no further action. The reason for resetting the continuity interval count timer in step S723 is that 10 is subtracted from the sensor detection request level each time that it is found that actuation of the accelerator lever has continued for 1 second. That is to say, if the actuation is continued for 3 seconds, then a total of 30 will be subtracted from the sensor detection request level.

Similar action with respect to the sensor detection request level occurs in each of the subroutines S723, S726, S733, S736, shown in FIG. 8A.

However if there is no preceding vehicle currently recognized (NO in step S721) then a decision is made as to whether or not the coast lever has been actuated continuously for 1 second (step S725). As described above, such actuation results in the "set vehicle speed fine adjustment decrease" switch being set in the ON state, thereby gradually decreasing a set value of vehicle speed that is stored in the vehicle separation control ECU 2. If it is found that the coast lever has been actuated continuously for 1 second in step S725, then the continuity interval count timer is reset (step S726) and the sensor detection request level is incremented by 10 (step S727). If the coast lever has not been actuated continuously for 1 second (NO in step S725), then a decision is made as to whether or not the aforementioned "cruise cancel" switch has been actuated (i.e., to terminate cruise control operation) (step S728). If such actuation has been performed (YES in step S728) then the sensor detection request level is incremented by 10 (step S729), while otherwise (NO in step S728) the subroutine ends, with no further action.

Pedal Actuation Handling Subroutine (Step S730)

As shown in FIG. 8A, in the first step S731, a decision is made as to whether or not a preceding vehicle is currently recognized. If so (YES in step S731) then a decision is made as to whether or not the accelerator pedal has been actuated continuously for 1 second (step S732). If it has been actuated continuously for 1 second (YES in step S732) then the continuity interval count timer is reset (step S733), and the sensor detection request level is decremented by 10 (step S734). If the accelerator pedal has not been actuated continuously for 1 second (NO in step S732) then the subroutine ends with no further action.

However if no preceding vehicle is currently recognized (NO in step S731) then a decision is made as to whether or not the brake pedal has been actuated continuously for 1 second (step S735). If it has been actuated continuously for 1 second (YES in step S735) then the continuity interval count timer is reset (step S736), and the sensor detection request level is incremented by 10 (step S737). If the accelerator pedal has not been actuated continuously for 1 second (NO in step S735) then the subroutine ends with no further action.

Windshield Wiper Operation Handling Subroutine (Step S740)

Figure 8B:
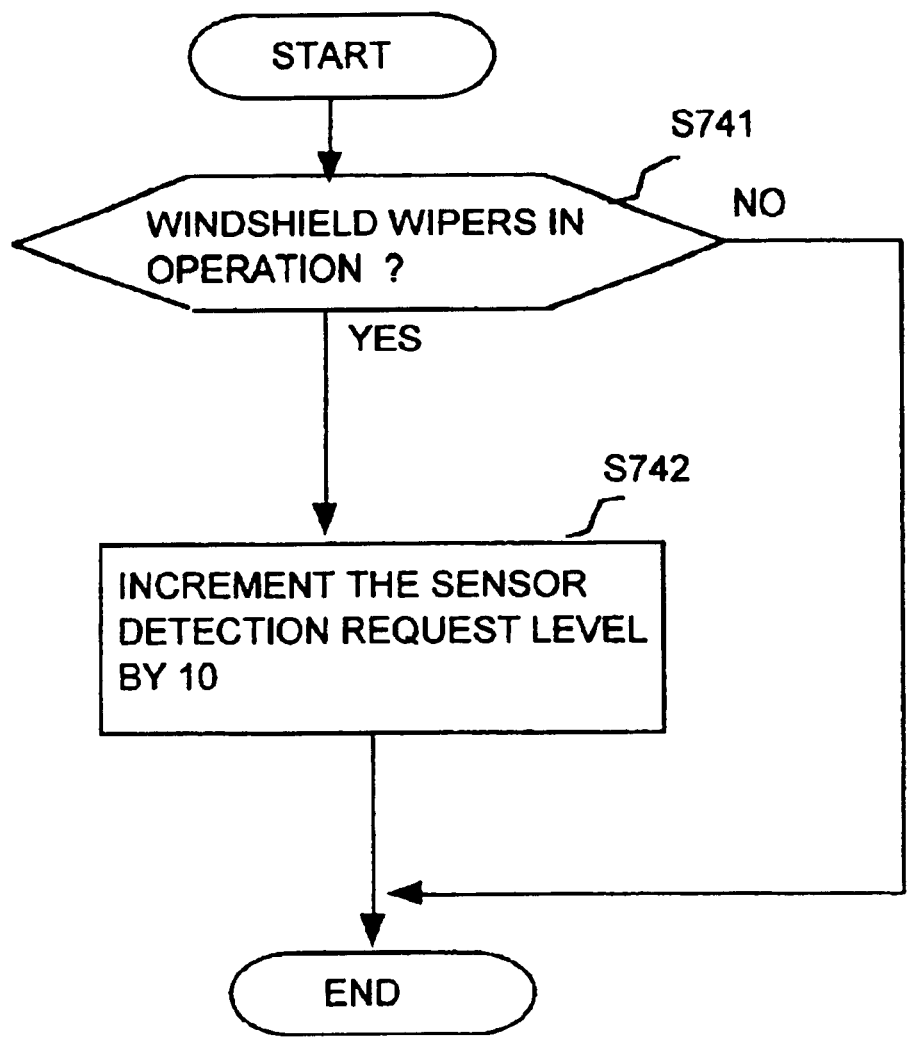
FIG. 8B is a flow diagram showing a windshield wiper handling processing subroutine which is executed as part of the subroutine of FIG. 6B.

As shown in FIG. 8B, in the first step (S741) a decision is made as to whether or not the windshield wipers are currently in operation. If so (YES in step S741) then the sensor detection request level is incremented by 10 (step S743). However if they are not in operation (NO in step S741) then the subroutine ends with no further action.

The target object detection request level subroutine (S800) will be described referring to FIG. 9. In the first step (S810) a decision is made as to whether or not a preceding vehicle is currently recognized. If not (NO in step S810) then the subroutine ends with no further action. If there is a preceding vehicle (YES in step S810) a decision is made as to whether or not the same target object has been selected as preceding vehicle continuously for 5 seconds (step S820) If the same target object has been recognized as a preceding vehicle continuously for 5 seconds (YES in step S820) then the target object detection request level is incremented by 10 (step S860). However if that is not the case (NO in step S820) then a decision is made as to whether or not the "cruise set" switch has been actuated (step S830). If so (YES in step S830) then a decision is made as to whether or not the inter-vehicle distance is less than 5 meters. If it is less than 5 meters (YES in step S840) then the target object detection request level is decremented by 10 (step S850). However if the distance is not less than 5 meters (NO in step S840) or if the "set cruise" switch has not been actuated (NO in step S830) then the subroutine ends with no further action.

As described hereinafter, the target object detection request level is transmitted to the radar section 3, for the purpose of adjusting the recognition processing such as to make it either easier or more difficult to continue to recognize each of respective target objects that are currently recognized.

In that way, whereas the sensor detection request level which is derived in the sensor detection request level judgement subroutine S700 is transmitted to the radar section 3 for effecting adjustment whereby recognition of any detected objects as being target objects is made either easier or more difficult, the target object detection request level which is derived in the target object detection request level judgement subroutine S800 serves to perform adjustment for rendering continued recognition of a specific target object (or each of a plurality of target objects) easier or more difficult.

The processing executed by the radar section 3 will be described in the following, referring first to FIG. 10 which is a flow diagram of a main processing routine that is executed by the radar section 3 at regular periodic intervals. Firstly, data which are used by the radar section 3 in object recognition processing (including host vehicle speed, estimated radius of curvature of travel path, sensor detection request level, target object detection request level) are received from the vehicle separation control ECU 2 (step S10). Next, rangefinder data (measured values of distance and angle for respected detected objects) obtained by the scanning rangefinder from one complete scan are read in (step S20). For example, if the scanning period is 100 msec, then this data will be read in once in every 100 msec. The term "complete scan" here signifies a succession of azimuth scans of a region extending ahead of the host vehicle, performed at respectively different angles of elevation. It will be assumed that with this embodiment a complete scan consists of six successive azimuth scans, e.g., with transmitted light of the lowest-elevation scan attaining the road surface at a position close to the front of the host vehicle.

Next (subroutine S30) threshold values for the non-vehicle judgement map (described in the following) are calculated, with the values being adjusted in accordance with the sensor detection request level that is received from the vehicle separation control ECU 2 in step S10. The map is used in the processing of the subroutine S40, and so for greater ease of description the subroutine S40 will first be described, followed by S30.

In the subroutine S40, whose basic contents are illustrated in the flow diagram of FIG. 11B, non-vehicle judgement processing is applied to the rangefinder data that have been read in step S20, i.e., is applied to successive values of received signal expressing received reflected light values obtained from the most recent scan performed by the radar apparatus of the radar section 3. Each such received signal value is obtained in conjunction with the estimated distance (from the host vehicle) of the surface from which the light was reflected, and the direction of that location with respect to the host vehicle. That direction and distance information are used to assign that received signal value to one of the three predetermined regions shown in the X-Y plane of the map in FIG. 12. In the following, such a received signal value will be referred to as a "received return" value, i.e., the rangefinder data contain received return values that have been successively obtained during a scan by the optical radar.

The non-vehicle judgement processing of a received return begins with assigning it to one of the aforementioned regions of the X-Y plane of the map (step S42) then using a section of the map that corresponds to that assigned region, to judge whether the received return belongs to a region in that map section whereby it is assigned to a "vehicle" category (step S43), and so does not correspond to a part of a preceding vehicle (step S43). It is found to correspond to a "non-vehicle" region (YES in step S44) then all data relating to that received return are discarded (step S45), while otherwise (NO in step S44, signifying that this received return is a valid received return value which can be used in subsequent processing to derive a target object) the next received return value is then processed. This sequence is repeated until all of the signal data obtained from the most recent radar scanning operation have been completed.

FIG. 12 shows the non-vehicle judgement map, which is used in steps S42, S43 of FIG. 11B. This is a 3-dimensional map, in which the orientations of the X and Y axes respectively correspond to the directions of the width and height dimensions of the host vehicle, e.g., with the intersection of these axes approximately corresponding, to a point midway between the right and left sides and top/bottom of the host vehicle. The Z axis is oriented along the travel direction of the host vehicle, with successively increasing Z-axis values expressing increases in distance from the front end of the host vehicle.

As indicated, the non-vehicle judgement map is divided, in the X-Y plane, into an (approximately) central region 103, a peripheral region 104 surrounding the central region, and an edge region 105, located at the lower edge as shown. The insert figures 100, 101 and 102 illustrate how pairs of non-vehicle and "vehicle indication" regions are defined in the map, respectively separately for the central region 103, peripheral region 104 and edge region 105. In each of these inset figures, levels of received signal strength Rs (indicative of corresponding values of reflected light intensity received by the radar apparatus) are plotted along the vertical axis and Z-distance values along the horizontal axis. Referring to insert figure 100, it can be understood that the boundary between the "non-vehicle indication" region and the "vehicle indication" corresponds to a plurality of combinations of a threshold value of Z-direction distance and a threshold value of received signal strength (i.e., indicative of received field light intensity). Such a boundary will be referred to as a "threshold value variation characteristic". If a received return value is found to have a Z-axis distance value and signal strength value which are each higher than the corresponding threshold value, then the received return value is within the "vehicle" region, while otherwise it is within the "non-vehicle" region.

As can be understood from inset figures 100, 101, 102, the shapes of the pairs of "vehicle", "non-vehicle" regions which are assigned to the peripheral region 104, central region 103 and edge region 105 in the map (X-Y plane) are respectively different in shape. That is to say, respectively different judgement processing is applied to a received return value in accordance with whether that received return value is found to correspond to a position in the central region 103, peripheral region 104 or edge region 105 of the map.

The principles on which are based the respectively different variation characteristics are as follows. Referring first to the inset figure 101, corresponding to the central region 103, a received return value whose corresponding distance lies within the range from 0 to Z1 and whose strength does not exceed the signal strength Rs threshold value corresponding to that distance, is judged to be in the "non-vehicle" category, while otherwise it is judged to be in the "vehicle" category. Z1 is made relatively small. This is due to the fact that if an object corresponds to a position within the central region 103 of the map, and is relatively distant from the host vehicle, then there is a high probability that the object is a vehicle, while if the object is relatively close and the received return value is relatively low, there is a substantially increased possibility that it is not a vehicle. Based on these considerations, the threshold value variation characteristic shown in figure 101 has been found to be optimum for distinguishing between received return values from vehicles and from non-vehicles.

Considering now the threshold value variation characteristic shown in inset figure 100, this corresponds mainly to the top edge and right and left-side edges of the map in the X-Y plane, i.e. the portion 104. When a received return value is from an object such as the ceiling or walls of a tunnel, a signboard, a guard rail, a hedge, etc., then it is probable that the received return value will be located in that peripheral region 104 of the map X-Y plane. In this case, the threshold value variation characteristic is extended along the Z-axis to a value Z2, substantially beyond Z1. This is because in this case, even if a received return value corresponds to a position relatively distant from the host vehicle, there is still a strong possibility that the object from which the light is reflected is not a vehicle, so that if the received signal strength level is insufficient and its distance is less than Z2, the object will not be classified in the "vehicle" region.

It will be understood that as the distance between an object and the host vehicle decreases, the level of received reflected light (i.e., the received return values) from that object will increase accordingly. For that reason it is necessary to shape the threshold value variation characteristics as shown, such as to increase the threshold value in accordance with decreasing values of inter-vehicle distance (smaller values of Z).

In the case of the threshold value variation characteristic shown in figure 102, applied to received return values which are judged to correspond to region 105, i.e., positions near the lower edge of the map (X-Y plane), there is a strong possibility that the received return is caused by reflected light from an object such as a white line which is formed on the road surface. For that reason, the threshold value variation characteristic is shaped such that relatively high threshold values of signal strength Rs are applied even to received return values whose associated distance (Z-axis value) is relatively large, while in addition the range of Z-values for which threshold value judgement will be applied is substantially greater than for the case of figure 101. This is due to the fact that, by comparison with received return values corresponding to the regions 103 or 104, there is a substantially lower possibility that a received return value corresponding to the region 105 has been reflected from a vehicle.

In particular a white line which is formed on a road surface may have a high degree of reflectance. However due to the increased signal strength threshold levels which are applied to received return values resulting from such an object, the possibility of erroneous identification as a vehicle is decreased. It is unlikely that these high threshold values will result in problems, due to the low probability that such received return values are from a vehicle.

It is possible that a received return value from a vehicle may be erroneously assigned to the lower edge region 105 of the map, as a result of pitching motion of the host vehicle. However even in such a case, it can be expected that the reflected light intensity will be high, if the object is a vehicle (e.g., if the light is reflected from a rear reflector plate of the vehicle) so that there is little disadvantage in increasing the signal strength threshold values such as to ensure that objects such as white lines will be excluded.

The non-vehicle judgement threshold value calculation processing (S30 in figure 10) whereby the threshold values of the vehicle absence judgement map are altered in accordance with the sensor detection request level (i.e., to shift the respective threshold value variation characteristics as described above referring to the inset figures 100, 101, 103) will be described referring to figure 11A. Firstly, the sensor detection request level is inputted (step S31) and if the level is 60 or higher (YES in step S32) then calculations are performed to lower the threshold values in the non-vehicle judgement map by an amount determined in accordance with the sensor detection request level. That is to say, referring for example to the inset figure 101 in FIG. 12, if the threshold values are lowered, then the threshold value variation characteristic 106 might be moved in the direction indicated by the arrow 107 to the position indicated by numeral 107. (step S33).

In that way, the range of received signal strength/Z-distance combinations which are judged as being in the "non-vehicle" category is made more narrow, and the range which are judged as being in the "vehicle" category is made wider. Hence, it is made easier for the system to recognize target objects.

However if the sensor detection request level is 40 or lower (YES in step S32) then calculations are performed to raise each of the threshold values in the non-vehicle judgement map by an amount determined in accordance with the sensor detection request level (step S35), so that each of the threshold value variation characteristics shown in the inset figures 100, 101, 102 in FIG. 12 is moved away the origin (0) point by a certain amount. In that way, the range of reflected-light intensity/distance value combinations which are judged as being in the "non-vehicle" category is made wider, and the range in which the values are judged as being in the "vehicle" category is made narrower. Hence, it is made more difficult for the system to recognize target objects.

If the sensor detection request level is within the range 40 to 60, then no change is made in the threshold values of the non-vehicle judgement map.

Returning to the explanation of the routine of FIG. 10, a type of processing referred to herein as "segmentation" is executed in step S50. In the following, received return values which fall within a "vehicle" region of the non-vehicle judgement map will be referred to as "valid received return values". In this processing, each set of valid received return values whose respective locations (i.e., locations of the respective reflection origins) in the aforementioned 3-dimensional (X, Y, Z) space are judged to satisfy predetermined conditions for being mutually adjacent (referred to in the following as connectivity conditions) are combined into a single unit, referred to as a segment, whose location in the 3-dimensional space is approximately the central point within that set.

The basis for this is as follows. If for example a preceding vehicle is equipped with reflector plates at the rear, or for some other reason has a plurality of highly reflective rear regions, then a plurality of valid received returns (having corresponding different heading angles) may be obtained by the scanning optical radar, from the same preceding vehicle. By associating the plurality of valid received return values into a single segment, these will be recognized as originating from a single vehicle. More specifically, each set of received return values which satisfy a first predetermined connectivity condition are combined into a two-dimensional unit referred to as a pre-segment, then each set of pre-segments which satisfy a second predetermined connectivity condition are combined into a (three-dimensional) final segment, which corresponds to a specific target object. In this embodiment, the pre-segments are defined in the X-Z plane shown in FIG. 12.

Figure 15A:
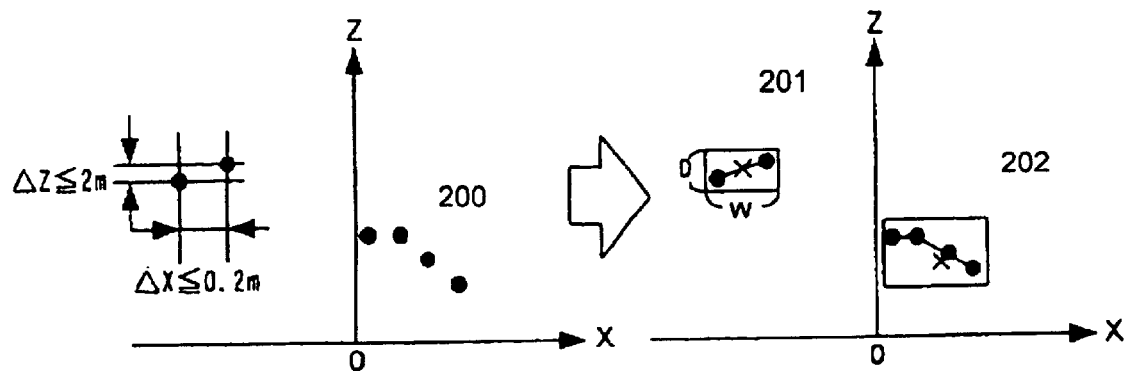
FIG. 15A is a diagram for use in describing segmentation processing which is applied to received signal values of the radar sensor apparatus.

The principles of the segment processing are illustrated in FIG. 15A, in which the black dots 200 represent valid received return values (as defined above) obtained in one scan by the radar apparatus. The connectivity condition for judging whether two received return values are to be assigned to the same pre-segment is that the Z-direction separation between these is no greater than 2 meters, and the X-direction separation is no greater than 0.2 meter. Thus as illustrated in FIG. 11, if the separation values between a set of received return values are sufficiently small, a segment 202 is defined.

For the purpose of data handling, each pre-segment is expressed by the coordinates of its center point (represented by a cross in FIG. 15A) and the width W along the X-axis direction and the depth D along the Z-axis direction, as indicated by numeral 201 in FIG. 11A.

With this embodiment as described hereinabove, the optical radar periodically performs a set of 6 sequential azimuth scans, which can be represented as 6 lines which are parallel to the X-axis and successively displaced along the Y-axis direction, in the X, Y, Z space. Pre-segmentation is applied respectively separately, for each of these scans, to the resultant received return values. Of the six sets of pre-segments which are thereby obtained for 6 successive scans, groups of pre-segments which satisfy a connectivity condition of being mutually adjacent in the X, Y, Z space are respectively unified into final segments. Each of the final segments is of 6-sided rectangular form, with pairs of opposing sides respectively oriented in the X, Y and Z-axis directions. For processing purposes, each final segment is expressed by the coordinates of its center point, and its width, height, and depth dimensions (w, h, d), in the X, Y, Z space.

It should be noted that the invention is of course not limited to the specific connectivity conditions described above. In addition, the embodiment could be advantageously configured such that the connectivity condition for forming pre-segments is varied in accordance with the sensor detection request level.

In the following, unless otherwise indicated, the term "segment" is to be understood as signifying a final segment as defined above.

A target object estimated displacement range is calculated in the subroutine S60 of the processing routine shown in FIG. 10. This range is used in processing for extracting respective target objects from the segment data in the succeeding subroutine S70, i.e., target objects which may represent respective vehicles. Since the target object estimated displacement range is used in the subroutine S70, the contents of that subroutine will first be described, followed by a description of the subroutine S60, for greater ease of understanding.

The term "target object" as used herein signifies a mathematical model of an object, derived based on a set of segments as described hereinafter. The target object extraction processing will be described referring to the flow diagram of FIG. 14. Firstly in step S51, the initial value of a variable i is set as 1, then in step S52 a decision is made as to whether or not there are one or more target objects Bi (where i=1, 2, 3, . . . ).

Figure 15B:
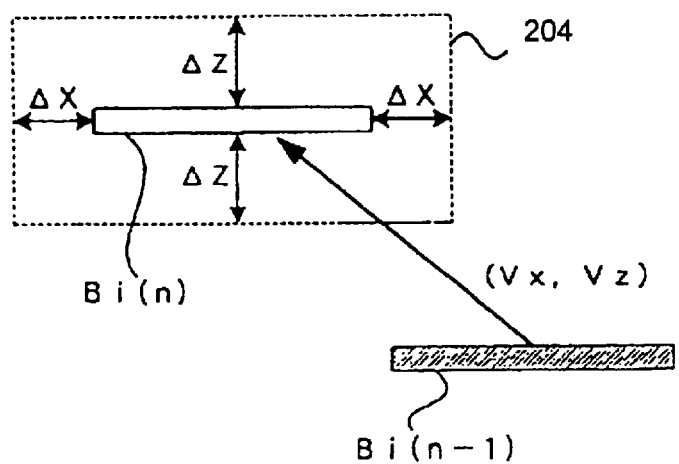
FIG. 15B is a diagram for use in describing a process of selecting segments which correspond to a specific target object.

If there already is a target object Bi (YES in step S52) then step S56 is executed, in which the segments corresponding to that target object Bi are detected. Detection of the segments corresponding to a target object Bi is performed as follows. Referring to the example of the displacement range 204 shown in FIG. 15B, if it is assumed that a target object has moved from a position indicated as Bi(n−1), which was the location found for that target object in the preceding execution of this subroutine, at a relative velocity (derived in the preceding execution of this subroutine) having components Vx, Vz along the X, Z directions respectively, then the estimated current position Bi(n) is calculated accordingly.

The estimated displacement range 204 is calculated as a range which extends by the amounts Δx, Δy along the X and Y axis directions respectively, as shown, around the estimated current position Bi(n). Any segment which is now found to have at least a part thereof that is inside the estimated displacement range is designated as being a corresponding segment of the target object B(i).

If there is no corresponding segment found for the target object B(i) in this execution of the subroutine, then continuation processing is executed. That is to say, the newly estimated current position Bi(n) and the relative velocity (Vx, Vy) that was obtained in the preceding execution of the subroutine are left unchanged, as continuation values, until the succeeding execution of the subroutine. In that succeeding execution, the segment detection processing described above is again performed, based on the continuation values. This continuation processing is limited to being performed only for a predetermined duration, i.e., a predetermined maximum number of successive repetitions of this subroutine.

It should be noted that this embodiment could be configured such as to adjust the maximum duration of continuation processing in accordance with the value of the sensor detection request level or the target object detection request level, throughout such an interval of applying continuation processing. This may be preferable when the host vehicle is running in an environment in which objects are being erroneously detected as vehicles to an excessive extent, due to the effects of electrical noise, reflections from the road surface, etc., so that it may not be possible to achieve stable operation of this subroutine (i.e., reliable determination of target objects and their positions).

If the maximum duration of continuation processing is determined in accordance with the sensor detection request level or target object detection request level in that way, then it can be ensured that when the driver performs some actuation (e.g., of the accelerator pedal) in an attempt to increase the host vehicle speed during automatic cruise control operation (for example, due to the fact that the system is erroneously recognizing some object as a preceding vehicle, and so has reduced the speed from the preset speed value, whereas the driver can see that there is no preceding vehicle), then the maximum duration of continuation processing will be shortened. This will result in reducing the possibility of erroneous detection of a (non-existent) preceding vehicle, so that the system may then be able to begin to accelerate the vehicle towards the preset speed value. In that way, the system can be adjusted to operate more appropriately in accordance with the current environment in which the host vehicle is running.

Conversely, if the driver performs some actuation for reducing the vehicle speed, this may be due to the fact that there is a closely adjacent preceding vehicle which has not bee detected by the system, and in that case the maximum duration of an interval of continuation processing would be automatically increased. The possibility of detecting the preceding vehicle is thereby increased, i.e., here again, the system would be adjusted to operate more appropriately in accordance with the current environment of the host vehicle.

In that way, the maximum duration of an interval of continuation processing can be appropriately controlled in accordance with the reactions of the host vehicle driver, such as to provide more effective detection operation than is possible by utilizing only analysis of the received radar signal values.

Figure 14:
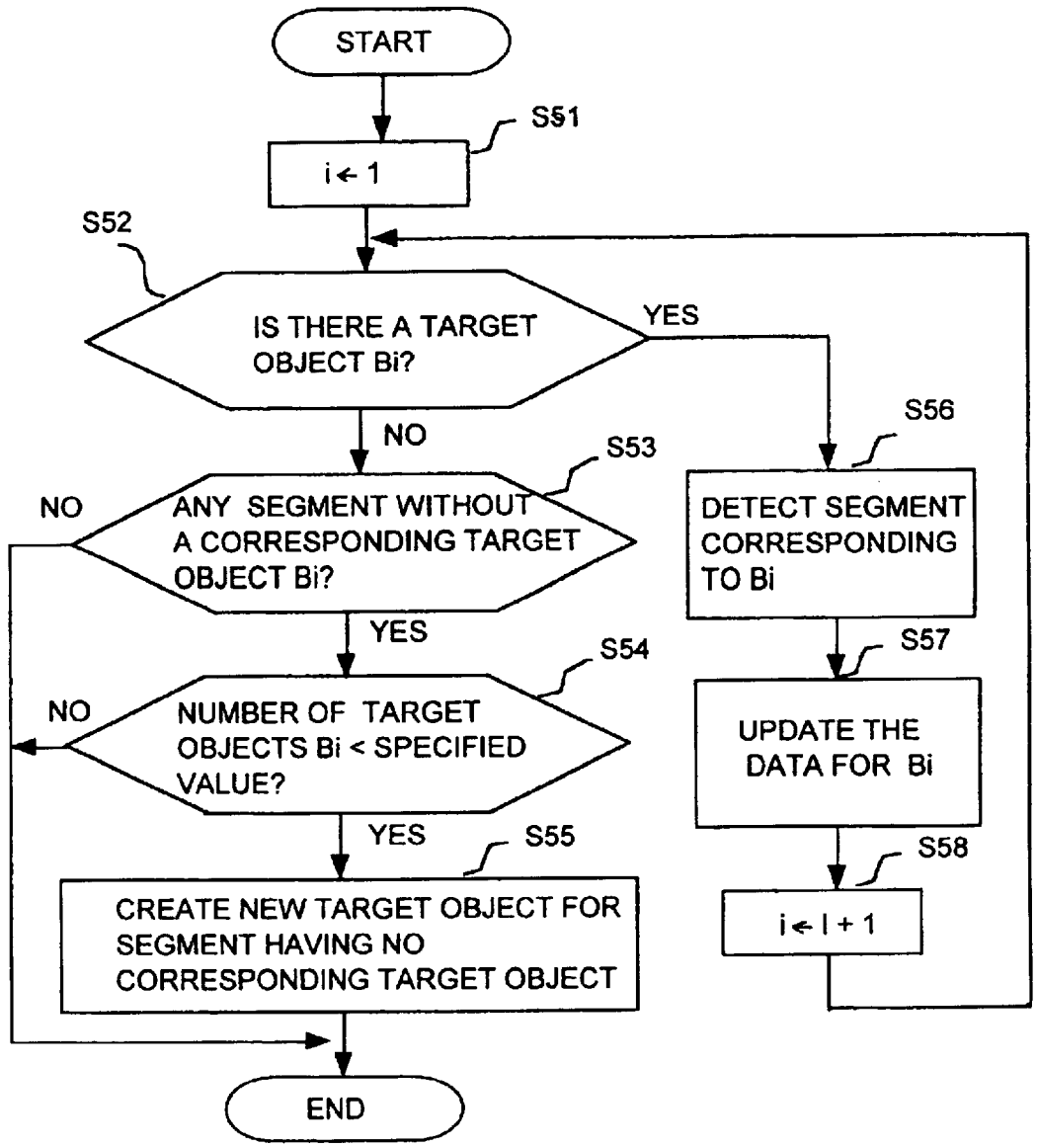
FIG. 14 is a flow diagram showing a target object determination processing subroutine which is executed as part of the routine of FIG. 10.

In step S58 of the subroutine shown in FIG. 14, processing to update the data of the target object Bi is performed in accordance with factors such as the presence or absence of segments corresponding to that target object. In that way, the data obtained for the target object Bi (i.e., the center coordinates, dimensions, relative speed, etc.) are updated in accordance with the results obtained from distance measurement, etc., in this execution of the subroutine. In step S58, after incrementing the variable i, operation returns to step S52, to being processing for the next target object (if any). If it is found that there are no further target objects to be processed (NO in step S52), then step S53 is executed in which a decision is made as to whether or not there is any segment for which no corresponding target object has been established. This condition may arise, in particular, immediately after start-up of the system, i.e., when the host vehicle engine is started. In the latter case, one or more segments may have been determined, in the immediately preceding execution of the segmentation step S50, with these segments not having been assigned to any target object yet. If it is found that there is at least one segment with no corresponding target object (YES in step S53), then step S54 is executed, in which a decision is made as to whether or not the total number of target objects which have been established so far is less than a predetermined value. If this is true (i.e., as will be the case immediately after starting the vehicle engine) then step S55 is executed, for successively deriving one or more target objects based on the non-assigned segments, as described hereinabove. This execution of the subroutine then ends.

If it is found in step S54 that the total number of target objects Bi has reached the predetermined limit value, then execution of the subroutine is ended.

By applying the processing subroutines S60, S70 in succession as described above it can be determined, for each of the segments which have been located in the precedingly executed segmentation step S50, whether the segment should be assigned to a target object Bi that was derived previously.

The target object estimated displacement range processing of subroutine S60 will be further described, referring to the flow diagram of FIG. 13. Firstly, the target object detection request level is inputted (step S61), and if that level is higher than 60 (YES in step S62) then a required degree of expansion of the estimated displacement range is calculated, in accordance with the target object detection request level (step S63). This corresponds to expansion of the estimated displacement range 204 shown in FIG. 15B. When this is done, it becomes easier to assign segments as corresponding to target objects, and hence it becomes easier to recognize target objects (where "easier to recognize" has the specific meaning defined hereinabove).

On the other hand, if the target object detection request level is lower than 40 (YES in step S64) then a required degree of compression of the estimated displacement range is calculated, in accordance with the target object detection request level (step S65). When this is done, it becomes more difficult to assign segments as corresponding to target objects, and hence it becomes more difficult to recognize target objects.

If the target object detection request level is in the range 40 to 60, then no change is made in the estimated displacement range.

Returning to the main routine shown in FIG. 10, in step S80 the preceding vehicle information, etc., are transmitted to the vehicle separation control ECU 2.

Since systems which determine the in-lane probability factor for a preceding vehicle (i.e., based on received signals of a radar apparatus and information such as the radius of curvature of the travel path) are known in the prior art, description of the necessary processing which is performed by the radar section 3, to derive the aforementioned in-lane probability factors for respective target objects, is omitted.

As can be understood from the above, the basic features of this embodiment are as follows. The brake ECU 4 and the engine ECU 6 respectively perform the acceleration function and deceleration function, while the radar section 3 performs a radar detection function and a target object recognition function. The vehicle separation control ECU 2 performs a preceding vehicle selection function and a cruise control function. The vehicle separation control ECU 2 and radar section 3, in combination, perform a recognition processing adjustment function (by use of the sensor detection request level and the target object detection request level as described above) whereby the target object recognition function and/or the preceding vehicle selection function are selectively modified in response to specific actions performed by the host vehicle driver, i.e., actuations of control members such as the accelerator pedal etc.

The above embodiment provides the following effects. Referring to the lever actuation handling processing subroutine S720 of FIG. 6B, shown in the flow diagram of FIG. 7, while the host vehicle is running in a condition in which no preceding vehicle is currently detected by the system (NO decision in S721) and the coast lever has been actuated for at least one second (YES in step S725), then the sensor detection request level (which has an initial value of 50) is incremented by 10 (step S727). Similarly, if the coast lever has not been actuated, but the cruise cancel lever has been actuated (YES in step S728) then the sensor detection request level incremented by 10 (step S729).

Similarly, referring to the pedal actuation handling processing subroutine S720 of FIG. 6B, shown in the flow diagram of FIG. 8A, if the host vehicle is running in a condition in which no preceding vehicle is currently recognized (NO in S731) but the brake pedal has been depressed for at least one second (YES in step S735), then the sensor detection request level is incremented by 10 (step S737).

It can thus be understood that with this embodiment, when the driver performs one of a set of predetermined actions which each indicate an intention to reduce the host vehicle speed, such as actuating the coast lever or the cruise cancel lever or depressing the brake pedal, while the system does not detect a preceding vehicle, then since the driver's visual capabilities should be given precedence over the cruise control system, the sensor detection request level is modified in a direction whereby the presence of a preceding vehicle will be more readily recognized by the system.

Specifically, for example referring to the non-vehicle judgement threshold value calculation subroutine S30 of FIG. 10, shown in the flow diagram of FIG. 11A, if the sensor detection request level has been incremented to 60 or higher due to the above increment processing having occurred (YES in step S32), then the threshold values (utilized with the map of FIG. 12 for non-vehicle judgement processing as described above) are lowered (step S33). In that way, the range of values of received reflected light intensity (i.e., optical radar received signal strength) within which received light will be judged to as being from a non-vehicle is made narrower, while the range within which received light will be judged as being from a vehicle is made accordingly wider, thereby rendering it easier for the system to recognize a vehicle (more specifically, making it more likely that a received radar signal value will be judged by the system as corresponding to a target object).

In that way, the object recognition processing executed by the system is automatically modified when it is detected that the host vehicle driver has performed some action which may indicate the presence of a preceding vehicle which has not yet been detected by the system (i.e., indicates that the driver is not satisfied with the current performance of the system with respect to detecting a preceding vehicle). The system thus performs adaptive control which is augmented by the cognitive capabilities of the vehicle driver, to achieve improved object recognition performance.

Conversely, referring again to FIG. 7, if the host vehicle is running in a condition in which a preceding vehicle is detected (YES decision in S721) and the accelerator lever has been actuated for at least one second (YES in step S722), then the sensor detection request level is decremented by 10 (step S724). Similarly, referring again to FIG. 8A, if a preceding vehicle is currently recognized (YES in S731) and the accelerator pedal has been depressed for at least one second (YES in step S732), then the sensor detection request level is decremented by 10 (step S734). In that way, when the driver performs one of a set of predetermined actions which each indicate a desire to increase the host vehicle speed, such as actuating the accelerator lever or depressing the accelerator pedal, while the system (presumably erroneously) detects a preceding vehicle and so is controlling the host vehicle speed such as to maintain a specific separation distance from that preceding vehicle, the sensor detection request level is lowered.

In that way, in a condition in which the cruise control system erroneously detects a preceding vehicle, while the driver can see that there is actually no preceding vehicle and acts accordingly to attempt to increase the host vehicle speed, recognition of a preceding vehicle by the system is rendered more difficult, i.e., the system operation is modified such as to lower the possibility of detection of a non-existent preceding vehicle.

Specifically, referring again to FIG. 11A, if the sensor detection request level has been lowered to 40 (YES in step S34) then the threshold values utilized with the map of FIG. 12 are increased (step S35). In that way, the range of values within which received reflected light will be judged to as being from a non-vehicle is made wider, while the range within which it will be judged as being from a vehicle is made narrower, thereby rendering it more difficult for the system to detect a vehicle (i.e., making it less likely that a non-vehicle object will be interpreted as being a vehicle).

Use is thereby made of the fact that the driver is unlikely (during cruise control operation) to perform an action such as actuating the accelerator lever or depressing the accelerator pedal if the cruise control system is correctly judging the current environment of the host vehicle. Instead, it is probable that the driver will perform such an action in a condition in which the cruise control system is incorrectly detecting a non-existent preceding vehicle, and has reduced the host vehicle speed from the preset speed value accordingly. Thus, here again the cognitive capabilities of the host vehicle driver are applied to augment the object recognition capabilities of the cruise control system.

Furthermore with this embodiment, referring to the windshield wiper handling processing subroutine of FIG. 6B, shown in the flow diagram of FIG. 8B, when the windshield wipers are in operation (YES in step S741), the sensor detection request level is incremented by 10 (step S742). This is done because the signal levels received by the vehicle separation control ECU 2 may be reduced due to the effects of rain, and hence the sensor detection request level is increased to thereby make it easier for the system to recognize objects.

Figure 9:
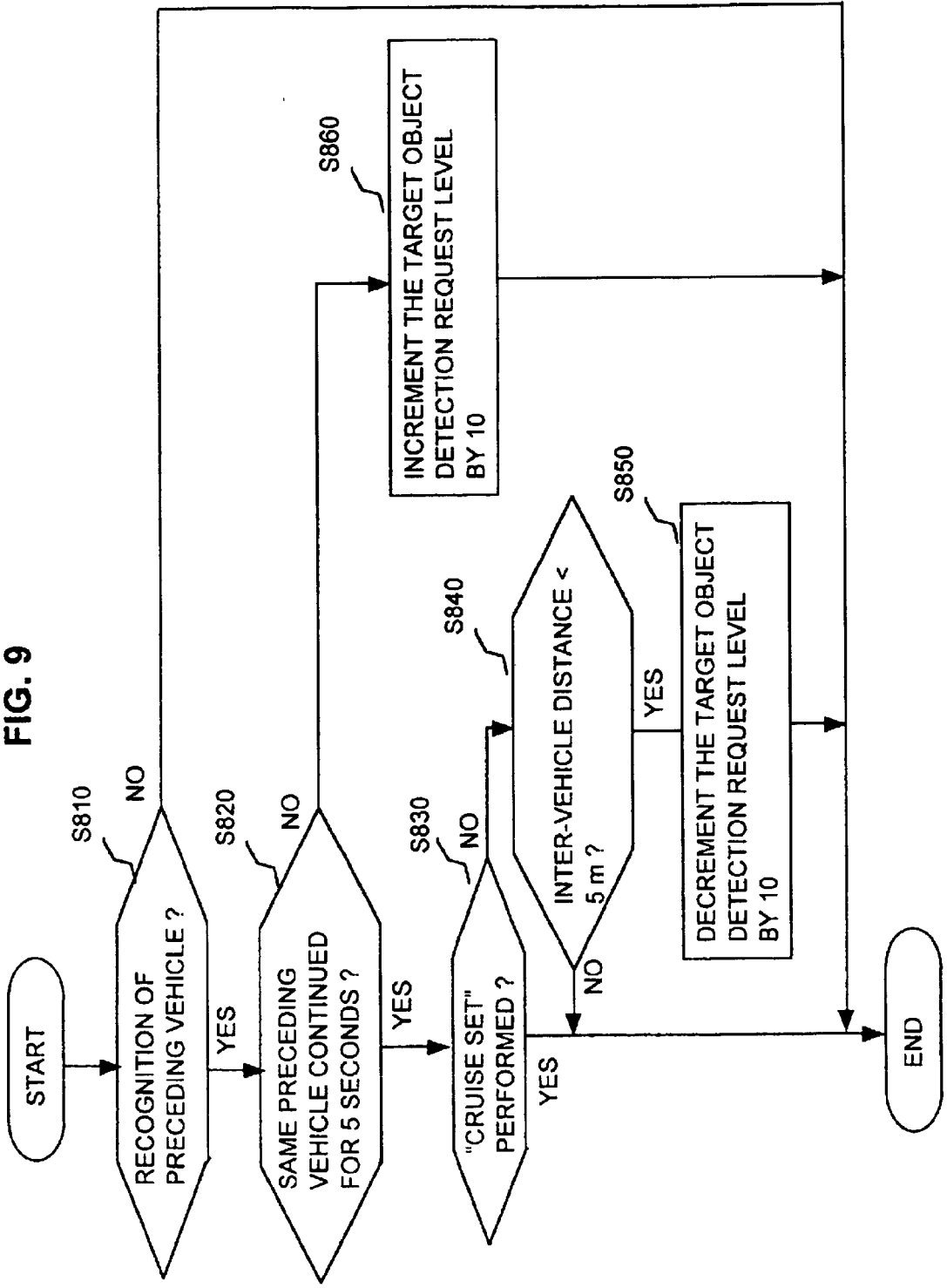
FIG. 9 is a flow diagram showing a target object detection request level judgement subroutine which is executed as part of the subroutine of FIG. 6A.

Moreover referring to the target object detection request level judgement subroutine S5800 of FIG. 6A, shown in the flow diagram of FIG. 9, if the same object has been recognized as a preceding vehicle continuously for 5 seconds (YES in step S820) then the target object detection request level is incremented by 10 (S860). The reason for this is that if the same object has been continuously interpreted by the system as being a preceding vehicle for such a duration, there is a strong possibility that the object actually is a vehicle. Hence, detection of the object is made easier.

That is to say, if the same object is recognized as a target object and is selected as being a preceding vehicle for a duration as long as the predetermined (5 seconds) interval, then this signifies that the host vehicle driver has not intervened during operation in the vehicle-following cruise control mode in that interval, so that the driver has judged that this control mode is appropriate (i.e., due to the driver having visual confirmation that there actually is a preceding vehicle). For that reason (i.e., a low probability that a detected object is being erroneously recognized as a vehicle) it is appropriate that preceding vehicle recognition by the system is made easier.

However, under a condition in which the system is not currently controlling the host vehicle, but has selected a target object as being a preceding vehicle, and in which the same target object has not been recognized as the preceding vehicle continuously for 5 seconds (NO in step S820), if the driver actuates the cruise set lever (YES in step S830) and if the separation distance between the host vehicle and the preceding vehicle which is estimated by the system is no more than 5 meters (YES in step S840), then the target object detection request level is decremented by 10 (step S850).

This is because the action of the driver in actuating the cruise set lever indicates that the driver believes the host vehicle should not be operating in the vehicle-following mode, i.e., that there actually is no preceding vehicle which is in close proximity to the host vehicle. Hence in that condition, it should be made more difficult for the system to recognize an object as a preceding vehicle.

That is to say, it is unlikely that the driver would start to operate the vehicle by cruise control if there is a preceding vehicle in close proximity. It should be noted that the FIG. of 5 meters is given as the judgement distance only by way of example.

In addition to the above embodiment description, the following points concerning the invention should be noted:

(1) With the above embodiment, object recognition by the radar section 3 is made easier or more difficult by adjusting the sensor detection request level and the target object detection request level. However it would be equally possible, as an alternative method, to make selection of a preceding vehicle easier or more difficult by adjustment of these levels. That is, when the host vehicle is running in a condition in which no preceding vehicle is currently detected, and the system detects some specific action performed by the host vehicle driver which is indicative of an intention to decelerate the vehicle, selection of a preceding vehicle is made easier. Conversely, with such a method, when the host vehicle is running in a condition in which a preceding vehicle is being detected (with cruise control in operation) so that the vehicle-following mode is entered, then if the system detects some specific action performed by the host vehicle driver which is indicative of an intention to accelerate the vehicle, selection of a preceding vehicle is made more difficult (i.e., since as described above, the driver's action indicates that the cruise control system is erroneously detecting a non-existent preceding vehicle).

Rendering the selection of a preceding vehicle easier or more difficult could for example be achieved by increasing or reducing each calculated value of the aforementioned in-lane probability factor which is derived by the radar section 3 for each target object as described above, or by altering the threshold value which is used to judge the in-lane probability factor.

As described above, the in-lane probability factor expresses the probability that a target object is in the same lane as the host vehicle. Using such a probability factor for selection of a preceding vehicle (i.e., from a plurality of candidate target objects) is a known prior art method. The in-lane probability factor is derived based on the direction in which the host vehicle is expected to advance (as a reference direction), and if a detected object moves to the right or left of that direction, the corresponding value of in-lane probability factor is lowered accordingly. If the in-lane probability factors are increased overall, then displacement of a detected object to the right or left of the direction of motion of the host vehicle will still result in a lowering of the in-lane probability factor for that object, however the magnitude of the decrease in probability will be reduced. Hence, selection of an object as being a preceding vehicle is made easier. Conversely, if the in-lane probability factors are decreased overall, then the magnitude of the decrease in in-lane probability factor for a detected object, due to displacement of the detected object to the right or left, will be increased. Hence, selection of an object as being a preceding vehicle is made more difficult.

Alternatively, as described hereinabove, that could be achieved by deriving a vehicle probability factor for each target object, i.e., rendering the selection of a preceding vehicle easier or more difficult could be achieved by increasing or reducing each calculated value of vehicle probability factor, or by altering each of one or more threshold values used to judge the in-lane probability factor.

More specifically, the vehicle probability factor expresses the degree of certainty that a detected object is a vehicle. Use of estimated vehicle probability for selecting a preceding vehicle from a set of candidate detected objects is known in the prior art. The vehicle probability is judged, for a target object, based on whether various judgement parameters exceed respectively predetermined threshold values. These can be, for example, threshold values of parameters such as the duration for which the object has continued to be detected, the relative speed of the object, the width and depth dimensions of the object, etc. If all of the threshold values are attained, then the object is judged to be a vehicle (i.e., it has a maximum degree of vehicle verification probability), while if only a part of these threshold value conditions are satisfied, then the object status is undefined (i.e., there is only a possibility that it is a vehicle), while if one or more predetermined basic conditions are not satisfied then the object is classified as a non-vehicle.

The principles of the present invention can be applied to such a method of preceding vehicle selection. That is to say, the threshold values of the respective judgement parameters can be decreased, to make the selection of a target object as a preceding vehicle easier, while conversely the threshold values can be increased in order to make selection of a preceding vehicle more difficult.

With the embodiment described hereinabove, the function of "rendering detection of a target object more easy, or more difficult" is executed by the radar section 3, while the function of "rendering selection of a preceding vehicle more easy, or more difficult" can be executed by the vehicle separation control ECU 2. It would be possible for a cruise control apparatus according to the present invention to use either one or both of these functions. However it should be noted that they provide basically different effects. Specifically, if the function "rendering detection of a target object more easy, or more difficult" is executed by the radar section 3, then this can enable the reception sensitivity of the radar apparatus to be increased under a condition in which an actual preceding vehicle is not being detected by the system, due to the performance of the radar apparatus being affected by adverse weather conditions (e.g., rain is weakening the levels of received reflected light), or due to the preceding vehicle having only a low degree of reflectance. Under such a condition, when the driver observes the preceding vehicle and takes action to decelerate the host vehicle, the system will respond appropriately, by making detection of a target object more easy. Conversely, if the system is incorrectly detecting a non-existent preceding vehicle, and the driver takes action to accelerate the host vehicle, then the system will respond appropriately.

On the other hand, if adjustment to make selection of a preceding vehicle more easy or difficult is applied (by the vehicle separation control ECU 2, in the case of the above embodiment) i.e., at the stage of utilizing the output data expressing one or more target objects which may be candidates for being a preceding vehicle, supplied from the radar section 3, then this has the following advantages. If the adjustment is based upon the respectively values of in-lane probability factor which are derived for each of the target objects and transmitted from the radar section 3 to the vehicle separation control ECU 2 as described hereinabove, then if for example the system is erroneously recognizing a vehicle which is in a different lane from the host vehicle as being a preceding vehicle, and is reducing the speed of the host vehicle accordingly, then when the driver takes action to accelerate the host vehicle, the system will respond appropriately by making selection of a target object more difficult (e.g., by increasing the threshold value for in-lane probability factor judgement, thereby reducing the possibility that there will be at least one target object that is a candidate for being a preceding vehicle, in step S320 of FIG. 3).

Conversely, if the system is failing to recognize an actual preceding vehicle (which is in the same lane as the host vehicle) and the driver takes action to decelerate the host vehicle, the system will respond appropriately by making selection of a preceding vehicle more easy (e.g., by decreasing the threshold value for in-lane probability factor judgement, thereby increasing the possibility that there will be at least one target object that is a candidate for being a preceding vehicle).

Alternatively, adjustment to make selection of a preceding vehicle more easy or difficult could be applied by varying one or more threshold values which are used to judge the aforementioned degree of vehicle probability. This would be effective in cases such as when an object which is not a vehicle is being erroneously selected by the system as a preceding vehicle (in which case, the threshold value(s) would be increased, e.g., to make it more difficult for target objects to be selected as candidates for being a preceding vehicle. Similarly, if an actual preceding vehicle is being incorrectly judged to be a non-vehicle, and the driver takes action to accelerate the host vehicle, then adjustment would be performed to lower the vehicle probability threshold value(s) and thereby to make it easier for target objects to be selected as candidates for being a preceding vehicle.

Thus, since respectively separate effects can be obtained in accordance with whether "rendering detection of a target object more easy, or more difficult" or "rendering selection of a preceding vehicle more easy, or more difficult" is implemented, both of these methods could advantageously be applied concurrently, to thereby obtain all of the effects described.

(2) Although the present invention has been described above with respect to a system which utilizes an optical radar producing laser light, the invention is equally applicable to other types of radar apparatus, such as millimeter-wave radar using electromagnetic waves, ultrasonic acoustic wave detection, etc. Furthermore the invention is not limited to the radar scanning method of the embodiment, but could equally be applied to a system in which not only the positions of objects but also their directions can be measured. For example when doppler radar such as millimeter-wave FMCW (Frequency Modulation Continuous Wave) radar is utilized, relative distance and relative speed information concerning a preceding vehicle can be derived together based on the received reflected electromagnetic waves, so that it is not necessary to calculate relative speed values based upon range information, as is necessary with an optical laser radar.

If FMCW radar is used, then the techniques of the present invention, for adjusting the degree of ease or difficulty of object detection in response to actions of the driver of the host vehicle, could be applied as follows. With FMCW radar, a modulated transmission signal is generated in which the transmission signal alternates between successively increasing in frequency and successively decreasing in frequency. The transmission signal is mixed with the received signal obtained from received reflected electromagnetic waves, which results in beat signal components being produced. In the case of electromagnetic waves reflected from a specific object, there will be two peaks in the amplitude of the beat signal components, i.e., a peak which results from mixing with the successively frequency-increasing part of the transmission signal and a peak which results from mixing with the successively frequency-decreasing part of the transmission signal. The system detects these peaks (i.e., by comparing the received signal level with a predetermined threshold value) and determines the respective frequencies at which the peaks occur, and based on that combination of peaks, can derive the relative speed and the range of the object from which the electromagnetic waves are reflected.

It can thus be understood that if the threshold value which is used for detection of these peak levels is lowered, then detection of a target object will be made easier, while conversely if the threshold value is raised, then detection of target objects is made more difficult. Hence, it is clear that the principles of the present invention could be directly applied to a cruise control apparatus which utilizes such a type of radar apparatus.

When such a peak frequency detection method is utilized, the system could be configured with a first frequency peak detection circuit which uses a relatively low threshold value and a second frequency peak detection circuit which uses a relatively high threshold value, with at least one of these being used in each detection operation. In that case, detection of target objects can be adjusted to be made easier if the first frequency peak detection circuit is applied in detection of an object which is travelling in the same direction as the host vehicle, while the second frequency peak detection circuit is applied in the detection of an object which is travelling in any other direction. Conversely, detection of target objects can be adjusted to be made more difficult by applying the second frequency peak detection circuit to the detection of all target objects.

With such a system, in order to prevent a peak pair which results from some effect such as noise from being detected as a target object, the time relation between the two peaks is judged, using a predetermined evaluation function. In that case it would be possible to adjust the evaluation function such as to render detection of a target object more easy. Conversely, detection of a target object could be made more difficult by adjusting the evaluation function such as to ensure that only objects having a high degree of probability of being a target object will be detected.

Furthermore, with such a cruise control apparatus which utilizes FMCW millimeter wave radar, it would be possible to perform adjustment to make selection of a preceding vehicle more easy or more difficult, by the same methods as described hereinabove for the preferred embodiment. With such a type of radar, erroneous selection of an object as being a vehicle which is preceding the host vehicle can occur under the following circumstances:

(a) Erroneous detection of a (non-existent) target object may occur due to the effects of noise (wherein "noise" here signifies in general such phenomena as reflections from the road surface, reflections due to side lobes of the radar antenna emission pattern, etc.), so that a non-existent object may be selected as a preceding vehicle.

(b) A side portion of a vehicle which is running in an adjacent lane of the highway may be erroneously detected, and that vehicle thereby erroneously selected as a preceding vehicle.

(c) A vehicle which is running ahead of the host vehicle, but in a different lane from the host vehicle, may be detected and erroneously selected as preceding vehicle.

(3) With the above embodiment, the detection processing that is performed by the radar section 3 is adjusted to make detection easier or more difficult, specifically, by adjusting threshold values used to evaluate the received signal level of the radar apparatus. However it would be possible to achieve a similar effect by increasing the intensity of the transmitted light or amplitude of the transmitted electromagnetic waves from the radar, in order to adjust the operation such as to make detection of target objects more easy, and to lower the transmitted intensity or amplitude in order to adjust the operation such as to make detection of target objects more difficult. If that is done, it becomes unnecessary to adjust the detection processing, to make target object detection more easy or more difficult.

(4) With the above embodiment, there is only a single vehicle separation control quantity, i.e., the target value of acceleration. However the invention is equally applicable to a system in which other control quantities are used, such as the acceleration deviation (i.e., difference between a target acceleration value and actual acceleration value).

(5) The above embodiment has been described with reference to only the brake system being used to effect deceleration, however the invention is equally applicable to vehicles using various other deceleration devices and systems. These include systems whereby the pressure in the brake hydraulic circuit is adjusted, or which can apply fuel cut-off control whereby the supply of fuel to the internal combustion engine is interrupted, or apply overdrive cut-off control whereby the overdrive position of the gear change lever is prevented from being selected, or which effect shift-down to a lower gear, or which apply ignition delay control whereby the ignition timing of the internal combustion engine is delayed, or lock-up control whereby a torque converter of the vehicle engine is set in a lock-up condition, or which utilize engine braking whereby the back pressure of the engine exhaust is applied to provide a braking effect.

(6) Furthermore with the above embodiment, the inter-vehicle distance between the host vehicle and a preceding vehicle is utilized directly, in controlling vehicle separation. However it would be possible to obtain similar results by using the inter-vehicle time interval which is obtained by dividing the inter-vehicle distance by the vehicle speed. That is to say, a control map of target acceleration values could be prepared, having relative speed (i.e., with respect to a preceding vehicle) and inter-vehicle time interval deviation ratio as parameters. In that case, when performing a control operation, a target acceleration value would be calculated based on the current values of relative speed and inter-vehicle time interval deviation ratio at that time, with vehicle separation control then being executed in accordance with that target value.

(7) Furthermore with the above embodiment, it is assumed that cruise control is performed with respect to a selected preceding vehicle, with target object detection (or preceding vehicle selection) being made easier or more difficult. However as an alternative, or as an additional feature of the above embodiment, a vehicle separation warning apparatus could be incorporated, whereby the inter-vehicle distance between the host vehicle and a preceding vehicle is used in conjunction with the relative speed of the preceding vehicle to calculate a warning judgement value, whereby when that value satisfies predetermined conditions, processing is executed for generating an audible warning which is directed to the driver of the host vehicle.

If such a proximity warning function were to be used alone, then since it would be difficult to judge the actions of the host vehicle driver based only on degrees of pedal actuation, it would be preferable to provide some other means for detecting the intentions of the driver, such as detection switches, etc.

It can thus be understood that although the invention has been described with respect to a specific embodiment, the description is not intended in a limiting sense, and various modifications and additions could be envisaged, which fall within the scope claimed for the invention as set out in the appended claims.

What is claimed is:

1. A cruise control apparatus installed on a host vehicle, including:

acceleration means and deceleration means respectively operable for accelerating and decelerating said host vehicle;

object recognition means including radar means for performing scanning of a region external to said host vehicle by sweeping emitted electromagnetic waves through a fixed angular range and for detecting resultant reflected waves, said object recognition means further including means for calculating at least the relative position and relative speed of a detected obstacle with respect to said host vehicle based on detection results obtained from said radar means, preceding vehicle selection means for selecting a vehicle that is a preceding vehicle with respect to said host vehicle, based on detection results obtained from said object recognition means; and cruise control means for acting on said acceleration means and deceleration means to effect control of an inter-vehicle distance such that said host vehicle follows a preceding vehicle, when said preceding vehicle has been selected by said preceding vehicle selection means, and to effect control for maintaining a fixed speed of said host vehicle in accordance with a set value of speed, when no preceding vehicle has been selected by said preceding vehicle selection means; wherein said cruise control means comprises:

adjustment means responsive to execution of a predetermined deceleration command action by a driver of said host vehicle for performing at least one of a group of adjustment operations, when said host vehicle is in a condition in which no vehicle is currently selected as a preceding vehicle by said preceding vehicle selection means and said cruise control means is applying control to cause said host vehicle to run at a fixed speed, said group of adjustment operations including an operation of acting on said object recognition means to render the detection of an external object easier and an operation of acting on said preceding vehicle selection means to render the selection of a preceding vehicle easier.

2. A cruise control apparatus installed on a host vehicle, including:

acceleration means and deceleration means respectively operable for accelerating and decelerating said host vehicle;

object recognition means including radar means for performing scanning of a region external to said host vehicle by sweeping emitted electromagnetic waves through a fixed angular range and for detecting resultant reflected waves, said object recognition means further including means for calculating at least the relative position and relative speed of a detected obstacle with respect to said host vehicle based on detection results obtained from said radar means, preceding vehicle selection means for selecting a vehicle that is a preceding vehicle with respect to said host vehicle, based on detection results obtained from said object recognition means; and cruise control means for acting on said acceleration means and deceleration means to effect control of an inter-vehicle distance such that said host vehicle follows a preceding vehicle, when said preceding vehicle has been selected by said preceding vehicle selection means, and to effect control for maintaining a fixed speed of said host vehicle in accordance with a set value of speed, when no preceding vehicle has been selected by said preceding vehicle selection means, comprising:

adjustment means responsive to information indicative of a predetermined acceleration command operation performed by a driver of said host vehicle for performing at least one of a group of operations, when said cruise control means is applying control of said inter-vehicle distance, said group including at least an operation of acting on said object recognition means to render the detection of an external object more difficult and an operation of acting on said preceding vehicle selection means to render the selection of a preceding vehicle more difficult.

3. A cruise control apparatus installed on a host vehicle, including:

acceleration means and deceleration means respectively operable for accelerating and decelerating said host vehicle;

object recognition means including radar means for performing scanning of a region external to said host vehicle by sweeping emitted electromagnetic waves through a fixed angular range and for detecting resultant reflected waves, said object recognition means further including means for calculating at least the relative position and relative speed of a detected obstacle with respect to said host vehicle based on detection results obtained from said radar means, preceding vehicle selection means for selecting a vehicle that is a preceding vehicle with respect to said host vehicle, based on detection results obtained from said object recognition means; and cruise control means for acting on said acceleration means and deceleration means to effect control of an inter-vehicle distance such that said host vehicle follows a preceding vehicle, when said preceding vehicle has been selected by said preceding vehicle selection means, comprising:

adjustment means responsive to information indicating that the same object has been continuously selected by said preceding vehicle selection means as a preceding vehicle during a predetermined time interval, for performing at least one of a group of operations which include at least an operation of acting on said object recognition means to render the detection of an external object easier and an operation of acting on said preceding vehicle selection means to render the selection of a preceding vehicle easier.

4. A cruise control apparatus installed on a host vehicle, including:

acceleration means and deceleration means respectively operable for accelerating and decelerating said host vehicle;

object recognition means including radar means for performing scanning of a region external to said host vehicle by sweeping emitted electromagnetic waves through a fixed angular range and for detecting resultant reflected waves, said object recognition means further including means for calculating at least the relative position and relative speed of a detected obstacle with respect to said host vehicle based on detection results obtained from said radar means, preceding vehicle selection means for selecting a vehicle that is a preceding vehicle with respect to said host vehicle, based on detection results obtained from said object recognition means; and cruise control means for acting on said acceleration means and deceleration means to effect control of an inter-vehicle distance such that said host vehicle follows a preceding vehicle, when said preceding vehicle has been selected by said preceding vehicle selection means, and to effect control for maintaining a fixed speed of said host vehicle in accordance with a set value of speed, when no preceding vehicle has been selected by said preceding vehicle selection means, comprising:

adjustment means for performing at least one of a group of operations in response to information indicating that a vehicle which is selected as a preceding vehicle does not satisfy predetermined conditions relating to at least one of the position and speed of said preceding vehicle, when said cruise control means is not executing said vehicle separation control and a control start command is issued by a driver of said host vehicle for starting said vehicle separation control operation, said group including an operation of acting on said object recognition means to render the detection of an external object more difficult and an operation of acting on said preceding vehicle selection means to render the selection of a preceding vehicle more difficult.

5. A cruise control apparatus as claimed in claim 1, wherein said deceleration operation comprises one of a group of operations including an operation of reducing a value of set speed which determines a fixed running speed of said host vehicle, an operation of actuating a brake pedal to thereby said deceleration means, and an operation of canceling control of said host vehicle by said cruise control means.

6. A cruise control apparatus as claimed in claim 2, wherein said acceleration operation comprises one of a group of operations including an operation of actuating an accelerator pedal to thereby drive said acceleration means.

7. A cruise control apparatus as claimed in claim 6, wherein:

said cruise control means is configured such that when no preceding vehicle is selected, said host vehicle is controlled to run at a fixed speed that is determined by a set speed value; and said group of operations includes an operation of increasing said set speed value.

8. A cruise control apparatus as claimed in claim 1, wherein:

said preceding vehicle selection means is configured to judge an in-lane probability factor as a degree of probability that an object which has been detected by said object recognition means is located in the same vehicle lane as said host vehicle, and utilizes said in-lane probability factor as a factor in said preceding vehicle selection; and said adjustment means performs adjustment whereby selection of a preceding vehicle by said preceding vehicle selection means is made easier or more difficult, by selectively increasing or decreasing said in-lane probability factor.

9. A cruise control apparatus as claimed in claim 1, wherein:

said preceding vehicle selection means is configured to judge when an in-lane probability factor exceeds a predetermined in-lane probability factor threshold value, said in-lane probability factor expressing a degree of probability that an object which is detected by said object recognition means is located in the same vehicle lane as said host vehicle; and said adjustment means performs adjustment whereby selection of a preceding vehicle by said preceding vehicle selection means is made easier or more difficult, by selectively increasing or decreasing said in-lane probability factor threshold value.

10. A cruise control apparatus as claimed in claim 1, wherein:

said preceding vehicle selection means is configured to determine a vehicle probability factor, which expresses a degree of probability that an object which is detected by said object recognition means is a vehicle, based upon information including a duration for which said object has been detected and an estimated shape of said object, and to perform selection of a preceding vehicle by including as a selection parameter said vehicle probability factor; and wherein said adjustment means performs adjustment whereby selection of a preceding vehicle by said preceding vehicle selection means is made easier or more difficult, by selectively increasing or decreasing said vehicle probability factor.

11. A cruise control apparatus as claimed in claim 1, wherein said preceding vehicle selection means is configured to determine a vehicle probability factor, which expresses a degree of probability that an object which is detected by said object recognition means is a vehicle, based upon information including a duration for which said object has been detected and an estimated shape of said object, to judge when said vehicle probability factor exceeds a predetermined vehicle probability threshold value and to perform selection of a preceding vehicle in accordance with whether or not said vehicle probability threshold value is exceeded; and wherein said adjustment means performs adjustment whereby selection of a preceding vehicle by said preceding vehicle selection means is made easier or more difficult, by selectively increasing or decreasing said vehicle probability threshold value.

12. A cruise control apparatus as claimed in claim 2, wherein said adjustment means is configured to operate during processing of an object which has been selected as a preceding vehicle.

13. A cruise control apparatus as claimed in claim 1, wherein said object recognition means is configured to perform scanning of transmitted electromagnetic waves in a region exterior to said host vehicle within a predetermined angular range, to detect the presence of objects located in a travel path of said host vehicle based upon a received signal derived from reflected electromagnetic waves, and to perform detection of a target object based upon judgment of values of signal strength of said received signal in relation to a received signal strength threshold value; and wherein said adjustment means performs adjustment whereby detection of an object by said object recognition means is made easier or more difficult, by selectively increasing or decreasing said received signal strength threshold value.

14. A cruise control apparatus as claimed in claim 13, wherein said object recognition means is configured to:

generate a multi-dimensional map of parameter values, said map including a pair of map regions comprising a first map region whereby a detected object having a combination of detection parameter values corresponding to a location in said first map region is judged to be a target object and a second map region whereby a detected object having a combination of detection parameter values corresponding to a location in said second map region is judged to be other than a target object; and judge that an object is to be assigned to said first region or second region in accordance with whether or not a value of signal strength of said received signal corresponding to said object exceeds a predetermined signal strength threshold value, wherein said adjustment means performs adjustment whereby detection of an object by said object recognition means is made easier or more difficult, by selectively increasing or decreasing said signal strength threshold value.

15. A cruise control apparatus as claimed in claim 14, wherein said combination of detection parameter values includes an estimated range of said detected object, and wherein said signal strength threshold value varies in accordance with said estimated range.

16. A cruise control apparatus as claimed in claim 14, wherein said map defines a plurality of said pairs of map regions, said pairs corresponding to respective ones of a plurality of regions within which a detected object may be estimated by said object recognition means as being located.

17. A cruise control apparatus as claimed in claim 1, wherein said object recognition means is adapted to:

perform scanning of electromagnetic waves within a predetermined angular range in a region external to said host vehicle and to express a plurality of resultant received signal values, corresponding to reflected electromagnetic waves from respective ones of a plurality of objects, as a corresponding plurality of points whose spatial relationships represent those of said objects; and combine a set of said points, each of which satisfies a predetermined proximity relationship condition, into a single entity which represents a target object, wherein said adjustment means performs adjustment whereby detection of an object by said object recognition means is made easier or more difficult, by selectively altering said proximity relationship condition.

18. A cruise control apparatus as claimed in claim 1, wherein said radar means is configured as a FMCW (Frequency Modulated Continuous Wave) radar apparatus which transmits electromagnetic waves modulated to alternate between a condition of increasing frequency and a condition of decreasing frequency in successive intervals and which produces a beat signal as an output received signal, and wherein said object recognition means is configured to:

detect peak frequency values as respective frequencies of said beat signal at which peak values of said beat signal occur which exceed a predetermined peak detection threshold value, and extract a pair of peak frequency values which respectively correspond to said intervals of modulation with increasing frequency and said intervals of modulation with decreasing frequency; and determine the range of an object and the relative speed of said object with respect to said host vehicle, based on said pair of peak frequency values, wherein said adjustment means performs adjustment whereby detection of an object by said object recognition means is made easier or more difficult, by selectively increasing or decreasing said peak detection threshold value.

19. A cruise control apparatus as claimed in claim 1, wherein said radar means is configured as a FMCW (Frequency Modulated Continuous Wave) radar apparatus which transmits electromagnetic waves modulated to alternate between a condition of increasing frequency and a condition of decreasing frequency in successive intervals and which produces a beat signal as an output received signal, and wherein said object recognition means is configured to:

detect peak frequency values as respective frequencies of said beat signal at which peak values of said beat signal occur which exceed a predetermined peak detection threshold value;

extract a pair of peak frequency values which respectively correspond to said intervals of modulation with increasing frequency and said intervals of modulation with decreasing frequency; and determine the range of an object and the relative speed of said object with respect to said host vehicle, based on said pair of peak frequency values, wherein said object recognition means is configured to selectively apply one of a first peak frequency detection method whereby a relatively high threshold value is utilized for detection and a second peak frequency detection method whereby a relatively high threshold value is utilized for detection; and wherein said adjustment means performs adjustment whereby detection of an object by said object recognition means is made easier, by controlling said object recognition means to apply said first peak frequency detection method for detection of a peak corresponding to motion along the travel direction of said host vehicle and to apply said second peak frequency detection method for detection of a peak corresponding to motion along any direction other than said travel direction of said host vehicle, and said adjustment means performs adjustment whereby detection of an object by said object recognition means is made more difficult, by controlling said object recognition means to apply said second peak frequency detection method for detection of a peak corresponding to motion along any direction.

20. A cruise control apparatus as claimed in claim 1, wherein said object recognition means periodically executes a processing sequence for object detection and further includes means for deriving the relative speeds and relative positions of detected objects, deriving an estimated displacement range for an object which was detected in a preceding execution of said processing sequence, and judging that an object that is detected in a current execution of said processing sequence and is located within said estimated displacement range is potentially identical to said object which was detected in the preceding execution, wherein said adjustment means performs adjustment whereby detection of an object by said object recognition means is made easier or more difficult, by selectively increasing or decreasing a set range which is utilized in determining the dimensions of said estimated displacement range.

21. A cruise control apparatus as claimed in claim 1, wherein said object recognition means periodically executes a processing sequence for object detection, and wherein when an object which was detected in a preceding execution of said processing sequence is not detected in a current execution of said processing sequence, continuation processing is executed in each of successive executions of said processing sequence until the end of a predetermined continuation interval is reached or said object is again detected, wherein said adjustment means performs adjustment whereby detection of an object by said object recognition means is made easier or more difficult, by selectively increasing or decreasing the duration of said continuation interval.

22. A cruise control apparatus as claimed in claim 1, wherein said object recognition means is configured for selective adjustment of an output power level of said transmitted electromagnetic waves; and wherein said adjustment means performs adjustment whereby detection of an object by said object recognition means is made easier or more difficult, by selectively increasing or decreasing said output power level of transmitted electromagnetic waves.

23. A computer program for implementing the functions of said object recognition means, said preceding vehicle selection means, said cruise control means and said adjustment means of said cruise control apparatus as claimed in claim 1, by a computer.

* * * * *